United States Patent
Bhandare et al.

(10) Patent No.: US 10,218,446 B2
(45) Date of Patent: *Feb. 26, 2019

(54) METHOD AND APPARATUS FOR CHARACTERIZATION AND COMPENSATION OF OPTICAL IMPAIRMENTS IN INP-BASED OPTICAL TRANSMITTER

(71) Applicant: Finisar Corporation, Horsham, PA (US)

(72) Inventors: Suhas P. Bhandare, Chalfont, PA (US); Heider N. Ereifej, Perkasie, PA (US); Ihab E. Khalouf, Bethlehem, PA (US); Mark Colyar, New Hope, PA (US)

(73) Assignee: Finisar Corporation, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/915,032

(22) Filed: Mar. 7, 2018

(65) Prior Publication Data
US 2018/0198531 A1 Jul. 12, 2018

Related U.S. Application Data

(63) Continuation-in-part of application No. 15/488,507, filed on Apr. 16, 2017, now Pat. No. 9,917,649,
(Continued)

(51) Int. Cl.
*H04B 10/58* (2013.01)
*H04B 10/588* (2013.01)
(Continued)

(52) U.S. Cl.
CPC ....... *H04B 10/58* (2013.01); *H04B 10/07955* (2013.01); *H04B 10/516* (2013.01); *H04B 10/564* (2013.01); *H04B 10/588* (2013.01)

(58) Field of Classification Search
CPC .............. H04B 10/58; H04B 10/07955; H04B 10/516; H04B 10/564; H04B 10/588
See application file for complete search history.

(56) References Cited

U.S. PATENT DOCUMENTS 9,124,364 B1 * 9/2015 Sotoodeh ......... H04B 10/50577
9,654,226 B1 * 5/2017 Bhandare ............... H04B 10/58
(Continued)

FOREIGN PATENT DOCUMENTS

JP   2011-022479 A   2/2011
WO   2013-079031 A1  6/2013

OTHER PUBLICATIONS

Notification Concerning Transmittal of International Preliminary Report on Patentability (Chapter I of the Patent Cooperation Treaty) for International Patent Application No. PCT/US2016/066036; Jun. 28, 2018, 6 pages, The International Bureau of WIPO, Geneva, Switzerland.
(Continued)

*Primary Examiner* — Leslie C Pascal
(74) *Attorney, Agent, or Firm* — Kurt Rauschenbach; Rauschenbach Patent Law Group, LLP

(57) ABSTRACT

A method and apparatus for characterizing and compensating optical impairments in an optical transmitter includes operating an optical transmitter comprising a first and second parent MZ, each comprising a plurality of child MZ modulators that are biased at respective initial operating points. An electro-optic RF transfer function is generated for each of the plurality of child MZ modulators. Curve fitting parameters are determined for each of the plurality of electro-optic RF transfer functions and operating points of each child MZ modulator are determined using the curve fitting parameters. An IQ power imbalance is determined using the curve fitting parameters. Initial RF drive power levels are determined that compensate for the determined IQ
(Continued)

power imbalance. The XY power imbalance is determined for initial RF drive power levels using the curve fitting parameters. The operating RF drive powers are determined that at least partially compensate for the first and second IQ power imbalances and for the XY power imbalance for the optical transmitter. An optical signal comprising a Nyquist-pulse-shape is generated at an output of the optical transmitter.

48 Claims, 14 Drawing Sheets

Related U.S. Application Data which is a continuation of application No. 14/975,738, filed on Dec. 19, 2015, now Pat. No. 9,654,226.

(51) Int. Cl.
 *H04B 10/079* (2013.01)
 *H04B 10/564* (2013.01)
 *H04B 10/516* (2013.01)

(56) References Cited

U.S. PATENT DOCUMENTS

| | | |
|---|---|---|
| 2009/0220235 A1 | 9/2009 | Joyner et al. |
| 2011/0135242 A1 | 6/2011 | Prosyk |
| 2015/0333475 A1 | 11/2015 | Blumenthal |
| 2016/0139485 A1* | 5/2016 | Winzer ............ G02F 1/2255 385/3 |

OTHER PUBLICATIONS

"Notification of Transmittal of the International Search Report and the Written Opinion of the International Searching Authority, or the Declaration" for International Patent Application No. PCT/UC2016/06636, dated Apr. 3, 2017, 9 pages, Korean Intellectual Property Office, International Searching Authority, Daejeon, Republic of Korea.

* cited by examiner

| D: Ch1 Optic Properties | | | G: Ch2 QPSK Bit Error results | M: Ch2 Optic Properties | | |
|---|---|---|---|---|---|---|
| RMS:25 | | | | RMS:25 | | |
| EVM | = 13.632 | % rms | | EVM | = 17.721 | % rms |
| EVM_pctl | = 1.1479 | % | | EVM_pctl | = 1.3636 | % |
| EVM_pctl Counts | = 27.648 | ksyms | BER (EVM) = 8.3572E-9 | EVM_pctl Counts | = 27.648 | ks |
| IQ Gain Imbalance | = 0.259 | dB | | IQ Gain Imbalance | = 0.171 | dB |
| IQ Offset | = -24.607 | dB | | IQ Offset | = -26.875 | dB |
| Quadrature Error | = 2.3341 | deg | | Quadrature Error | = 3.1651 | deg |
| Skew I<->Q | = 0.01450 | fs | | Skew I<->Q | = 0.01410 | fs |
| Q-Factor | = 8.654 | dB | DATA? | Q-Factor | = 7.515 | dB |

Average in Progress | Optical Power: -0.738 dBm | INT REF | CAL: None

FIG. 7B

| D: Ch1 Optic Properties | | G: Ch2 QPSK Bit Error results | M: Ch2 Optic Properties | |
|---|---|---|---|---|
| RMS:25 | | BER (EVM) = 1.5603E-10 | RMS:25 | |
| EVM | = 16.433 % rms | | EVM | = 15.892 % rms |
| EVM_pctl | = 1.2859 % | | EVM_pctl | = 1.2953 % |
| EVM_pctl Counts | = 35.840 ksyms | | EVM_pctl Counts | = 35.840 ks |
| IQ Gain Imbalance | = 0.252 dB | | IQ Gain Imbalance | = 0.163 dB |
| IQ Offset | = -24.199 dB | | IQ Offset | = -30.394 dB |
| Quadrature Error | = 1.8596 deg | | Quadrature Error | = 2.0622 deg |
| Skew I<->Q | = 0.01072 fs | | Skew I<->Q | = 0.00772 fs |
| Q-Factor | = 7.843 dB | DATA? | Q-Factor | = 7.988 dB |
| Average in Progress | | Optical Power: -0.709 dBm | INT REF | CAL: None |

FIG. 8B

METHOD AND APPARATUS FOR CHARACTERIZATION AND COMPENSATION OF OPTICAL IMPAIRMENTS IN INP-BASED OPTICAL TRANSMITTER

CROSS REFERENCE TO RELATED APPLICATION

The present application is a continuation-in-part of U.S. patent application Ser. No. 15/488,507, filed on Apr. 16, 2017, entitled "Method and Apparatus for Characterization and Compensation of Optical Impairments in InP-Based Optical Transmitter", which is a continuation of U.S. patent application Ser. No. 14/975,738, filed on Dec. 19, 2015, entitled "Method and Apparatus for Characterization and Compensation of Optical Impairments in InP-Based Optical Transmitter". The entire contents of U.S. patent application Ser. Nos. 15/488,507 and 14/975,738 are herein incorporated by reference.

The section headings used herein are for organizational purposes only and should not to be construed as limiting the subject matter described in the present application in any way.

INTRODUCTION

The ever increasing demand for optical fiber communication capacity continues to drive improvements in optical transmitter technology used in long-haul and metro optical network deployments. The need to address the combination of large bandwidth requirements, high port density, and lower system power consumption continue to push technology limits. In-Phase Quadrature-Phase (IQ) optical modulators support the high modulation bandwidths in today's coherent optical systems. Important modulator performance parameters for this application include low drive voltage to produce a phase shift of π-radians, $V_\pi$, high linearity, high modulation bandwidth, and low insertion loss. In addition, high-capacity systems demand a small form factor and high component reliability.

Current generation IQ modulators rely heavily on lithium niobate $LiNbO_3$ technology. However, $LiNbO_3$ modulators have fundamental limitations on the modulator size needed to achieve low drive voltages. Compound III-V semiconductor-based modulator technologies have the potential for high bandwidth and compact device configurations, and III-V devices are already widely used as optical laser sources and detectors in currently deployed telecommunications systems. Indium phosphide (InP) technology, in particular, is well suited for modulating telecommunication system wavelengths. Indium phosphide technology is also compatible with wafer-scale fabrication that allows precise process controls and can be used with low cost packaging. These features of indium phosphide technology have dramatically reduced the cost of InP modulator components, enabling InP modulators to have an acceptable cost per transmitted bit.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 7B illustrates a continuation of the measured performance data from the DP-QPSK transmitter without compensation shown in FIG. 7A.

FIG. 8B illustrates a continuation of measured performance data from a DP-QPSK transmitter using an embodiment of the compensation method of the present teaching.

DESCRIPTION OF VARIOUS EMBODIMENTS

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings may be performed in any order and/or simultaneously as long as the teaching remains operable. Furthermore, it should be understood that the apparatus and methods of the present teachings can include any number or all of the described embodiments as long as the teaching remains operable.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Recent developments have shown the ability of InP-based optical transmitter modulators to provide relatively high-bandwidth, relatively low drive voltage, and relatively low insertion loss. However, InP-based modulators are still not suitable for widespread deployment for various reasons. In particular, improvements need to be made in minimizing wavelength dependence of IQ power imbalance and XY power imbalance in dual-polarization in-phase and quadrature-phase InP optical modulators to generate ideal signal constellations for transmission in long-haul and metro optical networks.

One feature of the present teaching is to provide an apparatus and a method that first characterizes and then compensates for wavelength dependence of IQ power imbalance and XY power imbalance of a dual-polarization in-phase and quadrature optical transmitter modulator based on InP technology. An apparatus according to the present teaching includes a characterizer that actively determines parameters related to the IQ and XY power imbalances of the transmitter, and also a compensator that at least reduces and, in some cases, removes the IQ and XY power imbalances in the transmitter at any or all wavelengths.

Figure 1:
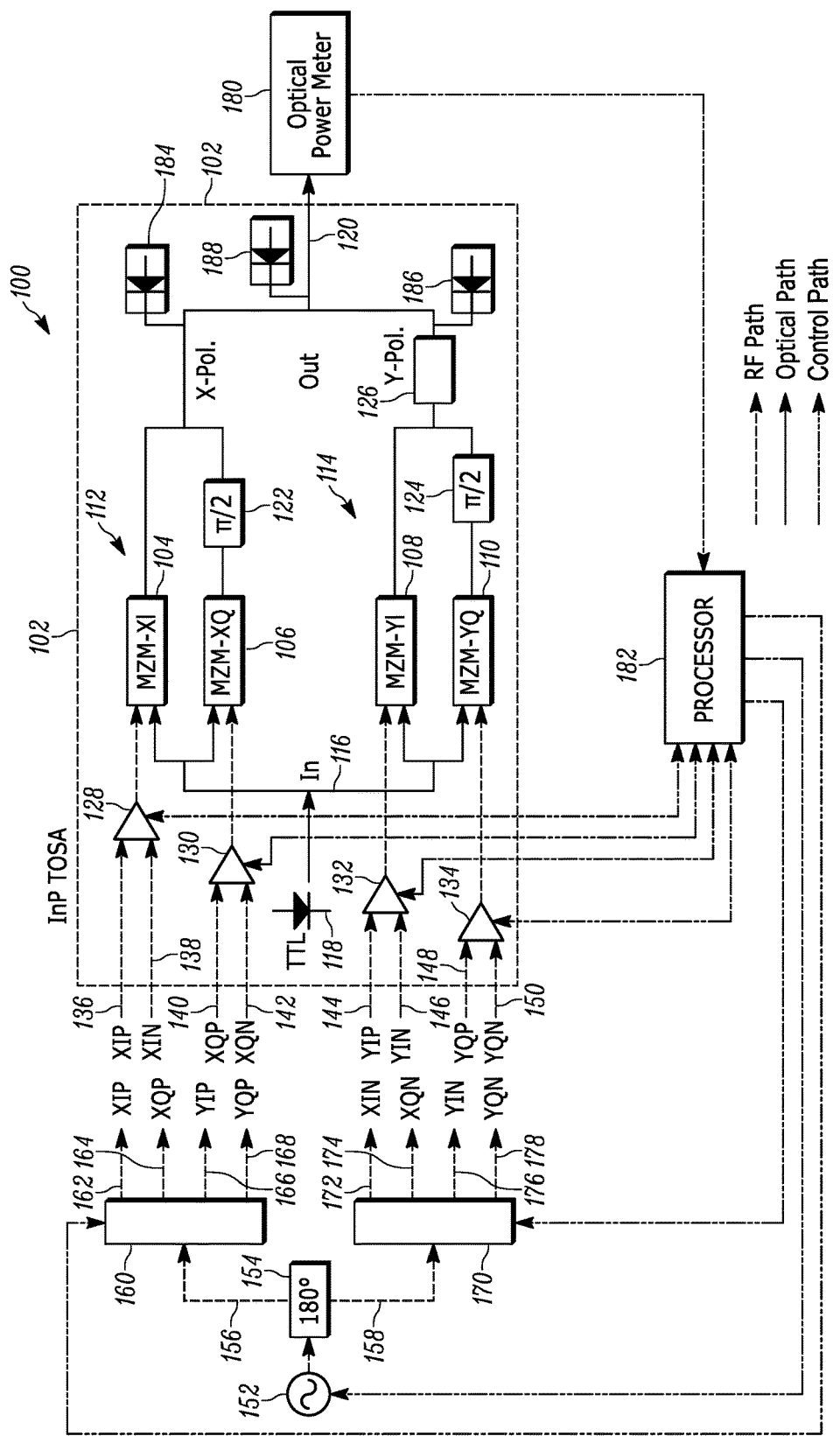
FIG. 1 illustrates an embodiment of an optical transmitter impairment characterizer and compensator according to the present teaching.

FIG. 1 illustrates an embodiment of an optical transmitter modulator impairment characterizer and compensator 100 according to the present teaching. The optical transmitter impairment characterizer and compensator 100 include a transmitter optical subassembly (TOSA) 102. In telecommunication and data communication networks and links, a TOSA is subassembly that is part of the optical transceiver system for sending and receiving data across an optical fiber. The TOSA 102 converts an electrical signal into an optical signal that is coupled into an optical fiber. In some embodiments, the transmitter optical subassembly 102 is housed in a gold enclosure. As the TOSA 102 is designed to interoperate with other optical subassembly units, TOSA 102 operating performance must be established and controlled using simple and effective characterization and compensation systems.

In some embodiments, the transmitter optical sub assembly 102 is a dual-polarization in-phase (I) and quadrature (Q) optical transmitter modulator. The dual-polarization in-phase (I) and quadrature (Q) optical transmitter modulator includes four child Mach-Zehnder (MZ) modulators 104, 106, 108, 110 nested to form a pair of parent MZ modulators referred to herein as a first 112 and second 114 parent MZ modulator. In some embodiments, the dual-polarization in-phase (I) and quadrature (Q) optical transmitter modulator uses InP-based optical modulator components. An optical input 116 of the dual-polarization in-phase (I) and quadrature (Q) optical modulator is optically coupled to the optical inputs of the first 112 and second 114 parent MZ modulator. The acronym MZM as used herein refers to Mach-Zehnder modulator.

The transmitter optical sub assembly 102 also includes a tunable laser source 118 that in some embodiments is a full C-band-wavelength thermally-tunable laser source. In the embodiment shown in FIG. 1, an output of the tunable laser 118 is optically coupled to the optical input 116 of the dual-polarization in-phase (I) and quadrature (Q) optical modulator. The transmitter optical sub assembly 102 produces wavelength tunable modulated optical signals, including 100-Gb/s DP-QPSK and/or 200-Gb/s DP-16QAM format optical signals, at an optical output 120.

In the configuration shown in FIG. 1, each of the first 112 and second 114 parent MZ modulator modulates one of the two polarizations in the dual-polarization modulator. For example, in the embodiment illustrated in FIG. 1, the MZ modulators 104, 106 are child MZ modulators forming the parent MZ modulator 112. The MZ modulator 106 is optically connected to a $\pi/2$ phase shifter 122. The output of the phase shifter 122 and the output of MZ modulator 104 are combined to form the output of parent MZ modulator 112 that generates an X-polarized modulated optical beam. Parent MZ modulator 112 is also referred to herein as the X-Pol. modulator. Similarly, the MZ modulators 108, 110 are child MZ modulators associated with the parent MZ modulator 114. The MZ modulator 110 is optically connected to a $\pi/2$ phase shifter 124. The output of the phase shifter 124 and the output of MZ modulator 108 are combined and pass through a 45° aligned polarization rotator 126 to form the output of parent MZ modulator 114 that generates the Y-polarized modulated optical beam. Parent MZ modulator 114 is also referred to herein as the Y-Pol. modulator.

In operation of the dual-polarization optical transmitter, the MZ modulators 104, 106 modulate in-phase and quadrature phase, respectively, on the X polarization optical beam modulated by the parent MZ modulator 112. The MZ modulators 108, 110 modulate in-phase and quadrature-phase, respectively, on an optical beam that passes through a 45° aligned polarization rotator 126 to provide Y polarization light modulated by the parent MZ modulator 114. The output of parent MZ modulator 114 and the output of parent MZ modulator 112 are combined to form the output 120 of the dual-polarization in-phase (I) and quadrature (Q) optical modulator of the transmitter optical subassembly 102.

The electrical modulation inputs of the MZ modulators 104, 106, 108, 110 are each connected to the output of a respective modulator drive amplifier 128, 130, 132, and 134. The modulator drive amplifiers 128, 130, 132, and 134 each supply modulation signals to the respective MZ modulators. In some embodiments, the modulator drive amplifiers 128, 130, 132, and 134 are linear radio-frequency modulator drive amplifiers. The modulator drive amplifier 128 connected to MZM-XI 104 has a positive differential input port XIP 136, and a negative differential input port XIN 138. The modulator drive amplifier 130 connected to MZM-XQ 106 has a positive differential input port XQP 140, and a negative differential input port XQN 142. The modulator drive amplifier 132 connected to MZM-YI 108 has a positive differential input port YIP 144, and a negative differential input port YIN 146. The modulator drive amplifier 134 connected to MZM-YQ 110 has a positive differential input port YQP 148, and a negative differential input port YQN 150.

The optical transmitter impairment characterizer and compensator 100 also include a signal generator 152. For example, the signal generator 152 may be a 1-GHz RF sinusoidal signal generator that produces varying RF output power levels. One feature of the present teaching is the use of relatively low RF frequencies for characterization, even as the data rates of the optical transmitter are relatively high. Using a signal generator with a low, 1-GHz bandwidth advantageously allows the characterization and compensation system to be implemented with a low-cost signal generator. The 1 GHz RF frequency has been shown to be sufficient to characterize the electro-optic response curve of the MZ modulators for operation of the optical transmitter at rates of 100 Gb/s or 200 Gb/s. In various embodiments, the signal generator 152 operates in an RF frequency range of 500 MHz to 3 GHz. This range of frequencies provides an acceptable characterization of the electro-optic RF response of the various MZ modulators, and also allows the embodiments to use low-cost signal generators. In one specific embodiment, the RF output power level of a 1-GHz sinusoidal signal source is varied between −15 dBm and +6 dBm.

The single-ended output of the signal generator 152 is electrically connected to a 180-degree RF hybrid 154. In some embodiments, the 180-degree RF hybrid 154 is a 3 GHz low-cost hybrid. The 180-degree RF hybrid 154 converts the single-ended output of the signal generator 152 to a differential output having a positive output 156 and negative output 158. The positive differential output 156 of the 180-degree RF hybrid 154 is electrically connected to a first 4-position RF Switch 160. The first 4-position RF Switch 160 switches the input amongst outputs at four ports including a first port 162 that is electrically connected to differential input port XIP 136, a second port 164 that is electrically connected to differential input port XQP 140, a third port 166 that is electrically connected to differential input port YIP 144, a fourth port 168 that is electrically connected to differential input port YQP 146.

The negative differential output 158 of the 180-degree RF hybrid 154 is electrically connected to a second 4-position RF Switch 170 that switches the input amongst outputs at four ports, a first port 172 that connects to differential input port XIN 138, a second port 174 that connects to differential input port XQN 142, a third port 176 that connects to differential input port YIN 146, a fourth port 178 that connects to differential input port YQN 150. The connections between the signal generator 152, 180-degree RF hybrid 154, the first and second 4-position RF Switches 160, 170, modulator drive amplifiers 128, 130, 132, and 134 and MZ modulators 104, 106, 108, 110 are electrical RF connections. Thus, the two RF switches 160, 170 serve to direct the differential output of the 180-degree RF hybrid 154 to the differential inputs of the RF modulator driver amplifiers 128, 130, 132, 134.

The characterizer and compensator 100 also include an optical power meter 180 having an optical input coupled to the optical output 120 of the transmitter optical sub assembly 102. In some embodiments, the optical power meter 180 is a wavelength calibrated optical power meter with a detector bandwidth of greater than 1 GHz. The optical power meter 180 detects RF modulation initiated at the signal generator 152 and imposed by the MZ modulators 104, 106, 108, 110 onto the wavelength tunable optical signal generated by the tunable laser source 118. The RF switches 160, 170 are used to cycle the RF modulation signals used for characterization onto each MZ modulator 104, 106, 108, 110 individually, so that the response of each MZ modulator 104, 106, 108, 110 may be individually characterized.

A processor 182 is used to collect data measured by the characterizer, and also to provide control outputs for the compensation by the characterizer and compensator 100. For characterization, the processor 182 is connected to an electrical output of the optical power meter 180 and an electrical output of the signal generator 152 using a control path. In some embodiments, the control path is provided by a general purpose interface bus (GPIB). The processor 182 collects the optical power data from the optical power meter 180 as a function of the signal generator power level provided by the signal generator 152 at various wavelengths output by tunable laser 118. The processor 182 may also derive RF output power information from the modulator drive amplifiers 128, 130, 132, 134. The RF output power of the driver amplifier is the RF input drive power to the MZM. The RF input power to the MZM is also commonly referred to as RF drive power or RF input drive power. Thus, the processor may collect the data representing the RF input power to the MZ modulators directly from the modulator drive amplifiers using a control path connection.

In some embodiments, the signal generator 152 generates a characterization RF modulation signal by ramping the power level of an RF tone or frequency from a low power to a high power. The particular starting and ending power levels of the characterization RF modulation signal depends on the $V_\pi$ of the MZ modulators 104, 106, 108, 110. The metric $V_\pi$ is the peak-to-peak input RF voltage to the MZ modulator required to induce a phase shift of $\pi$ radians onto the optical signal of the MZ modulator being driven. In many embodiments, the RF power of the signal generator 152 is varied between −15 dBm and +6 dBm depending on the $V_\pi$ of the MZ modulator.

In operation, the processor 182 determines the wavelength dependent in-phase and quadrature power imbalance by processing the data of the measured optical power as a function of signal generator drive power at various wavelengths. More specifically, the processor 182 determines the IQ-power imbalance as a power difference between I-child and Q-child MZ modulator's output optical powers per polarization of the dual-polarization in-phase and quadrature optical modulator. The processor 182 also determines the polarization power imbalance by processing the power difference between the modulated output power of the parent MZ modulator 112 and of the parent MZ modulator 114. That is, the processor 182 determines XY-power imbalance as a power difference between the light modulated in the X-polarization and the Y-polarization.

The processor 182 is electrically connected to control inputs associated with modulator drive amplifiers 128, 130, 132, and 134 associated with respective MZ modulators 104, 106, 108, 110. The processor 182 sends control signals to the drive amplifiers 128, 130, 132, and 134 that are used to manually set the voltage set points of the drive amplifiers to achieve a specific gain. In some embodiments, the modulator drive amplifiers 128, 130, 132, and 134 are controlled to operate in an automatic gain control mode of operation to unequally drive the respective RF modulation inputs of the MZ modulators 104, 106, 108, and 110.

The characterizer and compensator 100 generates at an optical output 120 signals that are compensated for optical impairments, such as wavelength dependent IQ power imbalance and XY power imbalance, of the InP-based transmitter optical sub assembly 102. In one embodiment, the optical output 120 of the compensator of the characterizer and compensator 100 provides a 100-Gb/s DP/QPSK and/or 200-Gb/s DP-16QAM optical communication signal that is compensated for wavelength dependent and polarization dependent power balances, including IQ power imbalance and XY power imbalance.

One feature of the characterizer and compensator 100 of the present teaching is that characterization and compensation can be performed in the field. Internal photodetectors 184, 186, and 188 are connected to the output of the two parent MZ modulators 112, 114, and also to the combined output 120 of the transmitter optical sub assembly 102. Field compensation can be used to compensate for component aging in the field that causes IQ and XY power imbalances.

The IQ power imbalance is somewhat independent of temperature in part because the I and Q child MZ modulators are embedded into a parent MZ modulator super structure built onto a monolithic substrate. Each IQ parent MZ modulator chip physically sits on a thermo-electric cooler (TEC) operated to maintain a particular temperature, which is set to an operating temperature in range from 40° C. to 50° C. Moreover, RF automatic gain control is running on RF driver amplifiers using temperature compensated RF peak detector diodes. Consequently, factory calibration is commonly sufficient as far as IQ imbalance variation is concerned.

The XY power imbalance may occur in the field in some practical embodiments because external bulk optical components are used to polarization multiplex the two outputs of the two separate IQ MZ modulator chips which perform IQ modulation and the coupling efficiency is sensitive to temperature in some circumstances. To overcome this dependence of XY power imbalance, a photodiode 188 is placed at the output 120 of the transmitter optical subassembly 102 to couple and measure light from the output of the TOSA 102 in the field.

Another feature of the characterizer and compensator 100 of the present teaching is that characterization and compensation can be used to compensate for thermal effects. A simple DC approach can be used to close the temperature sensitive feedback loop. First, the responsivities of the two internal photodiodes 184, 186 connected to each parent MZ modulator 112, 114 are calibrated with respect to the output optical powers belonging to each respective polarization, X-Pol. and Y-Pol. Then the two photodiode 184, 186 output currents are used by the processor 182 in normal operation to estimate the final output power exiting the transmitter optical subassembly 102 in each polarization. This estimated power is compared to a total measured optical output power using a final tap monitor photodiode 188 to generate an error signal that can be used to compensate XY power imbalance variation.

One skilled in the art will appreciate that while the impairment characterizer and compensator 100 of FIG. 1 is illustrated and described in connection with a DP-QPSK/DP-16QAM-type transmitter, it should be understood that the impairment characterizer and compensator of the present teaching can be used with numerous other optical transmitters. Furthermore, while some embodiments of the present teaching are described in connection with InP-based optical modulators, it will be understood to those familiar with the state-of-the art in optical transmitter technology that the compensator of the present teaching can be applied to numerous other types of optical modulators.

Figure 2:
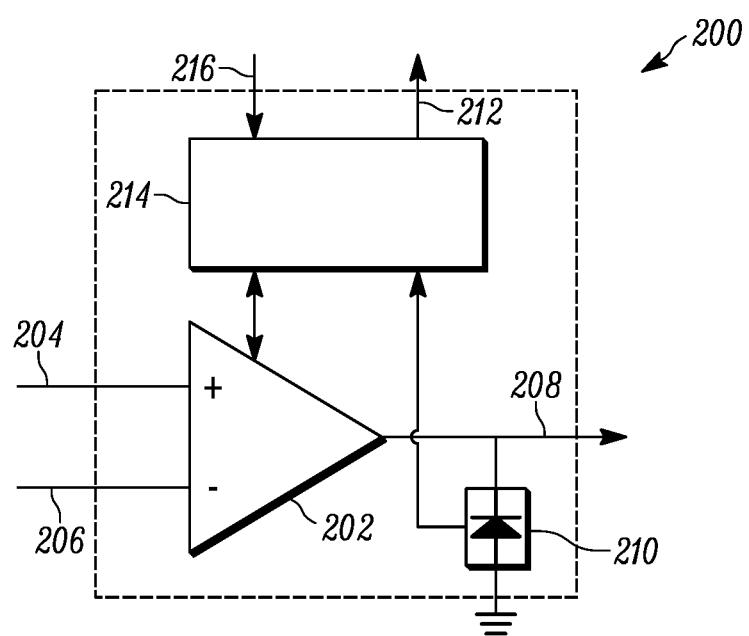
FIG. 2 illustrates an embodiment of a modulator drive amplifier according to the present teaching.

In some embodiments, the drive voltage and RF input power applied to the MZ modulators by the modulator drive amplifiers 128, 130, 132, and 134 is determined using an RF power readout provided directly from the modulator drive amplifiers 128, 130, 132, and 134. FIG. 2 illustrates an embodiment of a modulator drive amplifier 200 of the present teaching. Those familiar with the state-of-the-art will appreciate that any number of modulator drive amplifier designs may be used in the present teaching. The particular modulator drive amplifier 200 described in connection with FIG. 2 includes an electrical amplifier 202 comprising one of many electrical amplifier designs known in the art. In some embodiments, the electrical amplifier 202 comprises a two-stage or three-stage driver amplifier that includes a first differential amplifier stage, followed by a second and a third single-ended amplifier stage. The modulator drive amplifier 200 has two differential inputs 204, 206 for applying positive and negative RF signals. The modulator drive amplifier 200 has a single-ended output 208 that provides RF output voltages to a MZ modulator input. In some embodiments, the modulator drive amplifier may also have a differential output. A differential output allows, for example, a differential drive for a dual polarization modulator, such as a InP dual-polarization IQ modulator that is driven differentially. Some embodiments of the modulator drive amplifier 200 include a peak detector 210, which may be an RF peak detector diode, connected from the output 208 of the amplifier 200 to ground.

The output power and hence voltage at the output of the modulator drive amplifier's output 200 can be read as a rms output voltage of the RF peak detector 210 through a readout port 212 of the modulator drive amplifier 200. The modulator drive amplifier 200 includes a firmware component 214 that is used to control the output power and gain of the electrical amplifier 202. The firmware component 214 has an input 216 that allows users to provide various inputs to control the modulator drive amplifier 200. For example, users can input a gain control voltage that controls the RF output power provided by the electrical amplifier 202 at the output 208 and/or the gain of the electrical amplifier 202 from the input to the output. Users can also control whether the readout and/or control functions are provided in voltage domain or in power domain. In some embodiments, the modulator drive amplifier 200 is a linear RF driver amplifier that is a variable gain amplifier having a gain control input. Gain is varied by adjusting the voltage applied to respective gain control inputs.

One feature of the present teaching is that the accuracy of the determined value of input RF power can be improved by reading the voltage and/or power directly applied to the MZ modulator at the output 208 of the modulator drive amplifier 200 using the readout port 212 of the peak detector 210 voltage. The peak detector 210 may be an RF peak detector diode. In some embodiments, the RF peak detector diodes' readouts are read using analog-to-digital converters that are connected via a serial communication interface bus, such as a serial peripheral interface bus (SPI) or an Integrated Circuit Bus (I2C). Referring both to FIG. 1 and FIG. 2, the interface bus connects the processor 182 to the differential amplifiers 128, 130, 132, 134 via the readout port 212. In some embodiments the electrical amplifier 202 is a linear differential input and single-ended output modulator driver amplifier with RF automatic gain control (RF AGC). In some embodiments, the peak detector diode 210 is an RF peak detector diode having a frequency response that is greater than 15 GHz that is used to measure the RF output power at the modulator driver amplifier's output 208.

In some embodiments of the method of the present teaching, the peak detector 210 is calibrated by pre-characterizing its DC output voltage readout as a function of peak-to-peak RF input voltage for three test cases. The calibration provides a calibrated voltage or power provided to the input of each MZ modulator as a function of the voltage or power value being read off the RF peak detector. In some methods according to the present teaching, this calibration is done before the steps of characterization and compensation of optical impairments are performed.

The calibration of the RF peak detector 210 begins by measuring the response of the RF peak detector 210 at three points. The first data point is with no RF voltage applied, in other words, a DC offset voltage. That is, the RF peak detector diodes' DC offset voltage is measured when no RF input voltage is applied to the modulator driver amplifier and the modulator driver amplifier is itself connected to a rated power supply. This DC offset voltage is used for RF peak detector DC readout calibration. In particular, during calibration, this DC output offset voltage is subtracted from the measured RF peak detectors' output DC voltage when an RF input voltage is applied to the modulator driver amplifiers' input.

For the second data point, the RF peak detector diodes' DC output voltage is measured when modulator driver amplifier is producing a selected value that is proportional to $V_{pp}$, where $V_{pp}$ indicates a peak-to-peak voltage, at its output. For example, in one particular embodiment, the modulator driver amplifier produces a selected value equal to about 2.4 $V_{pp}$. This peak-to-peak voltage corresponds to a RF power level of +11.6 dBm. In this embodiment, the modulator drive amplifier is set to the 2.4$V_{pp}$ value by adjusting the voltage applied to the modulator driver amplifiers' gain control input. In other embodiments, a different value is used to set the modulator drive amplifier via an appropriate adjustment of the voltage applied to the modulator driver amplifiers' gain control input. The selected values are chosen based on, for example, particular types of RF driver technology and/or particular types of modulator technology that are used in the transmitter.

For the third data point, the RF peak detector diodes' DC output voltage is measured when modulator driver amplifier is producing a selected value that is proportional to $V_{pp}$ at its output that, in one particular embodiment, is equal to about 3.7 $V_{pp}$. This peak-to-peak voltage corresponds to a RF power level of +15.3 dBm. These values are obtained, once again, by readjusting the voltage applied to the modulator driver amplifiers' gain control input.

The next step in the calibration is to determine the RF power being supplied by the differential amplifier as a function of the gain control voltage input applied to the differential amplifier using the three test data points established for the RF peak detector calibration. The RF peak detector's DC output voltage readout follows Shockley's' ideal diode equation and thus is an exponential function of the peak-to-peak RF input voltage that is applied to it. As such, a natural logarithm, which is a logarithm of a number to base e where e is irrational and transcendental constant equal to 2.718281828459, is used to convert the RF peak detectors' DC readout voltage that is being read into a readout that is linearly proportional to the RF power that is being measured by the RF peak detector diode. Before taking the natural logarithm of the RF peak detectors' DC output voltage, its DC output offset voltage is subtracted from the measured RF peak detector's DC output voltage produced in response to an applied RF input voltage to it.

Two calibration data points corresponding to two other measurement points are then used to fit a linear equation, an equation characterized by a straight line in slope-intercept form. The computed slopes and y-intercepts are used to accurately determine the RF power level reached at the output of the corresponding modulator driver amplifiers at a particular value of the voltage applied to their corresponding gain control inputs. The RF output power level of the linear RF modulator driver amplifiers can be controlled precisely over a designed dynamic range of 6 dB using its gain control voltage input. The RF automatic gain control function is implemented in the firmware component 214 using a proportional integral control algorithm. The RF automatic gain maintains the MZ modulator's RF drive power level at a constant value. In this way, the MZ modulator RF drive power level can be known precisely as a function of the applied gain control voltage and/or the value of the RF peak detector readout voltage levels can be known precisely as a function of the applied gain control voltage using the calibration the method described herein.

In some methods according to the present teaching, gain control voltages are adjusted on each of the RF driver amplifiers after calibration, but before beginning the characterization of the optical transmitter. In one specific method, these adjustments are made so that the calibrated RF peak detector reads 2$V_{pp}$, corresponding to +10 dBm RF output power at the output of the RF driver amplifiers for a −13 dBm differential-input from the 180-degree RF hybrid. The input to the 180-degree hybrid from the 1-GHz signal generator is set to −10 dBm so that the RF amplifier has fixed 20-dB gain at the start of the RF power sweeps.

Figure 3:
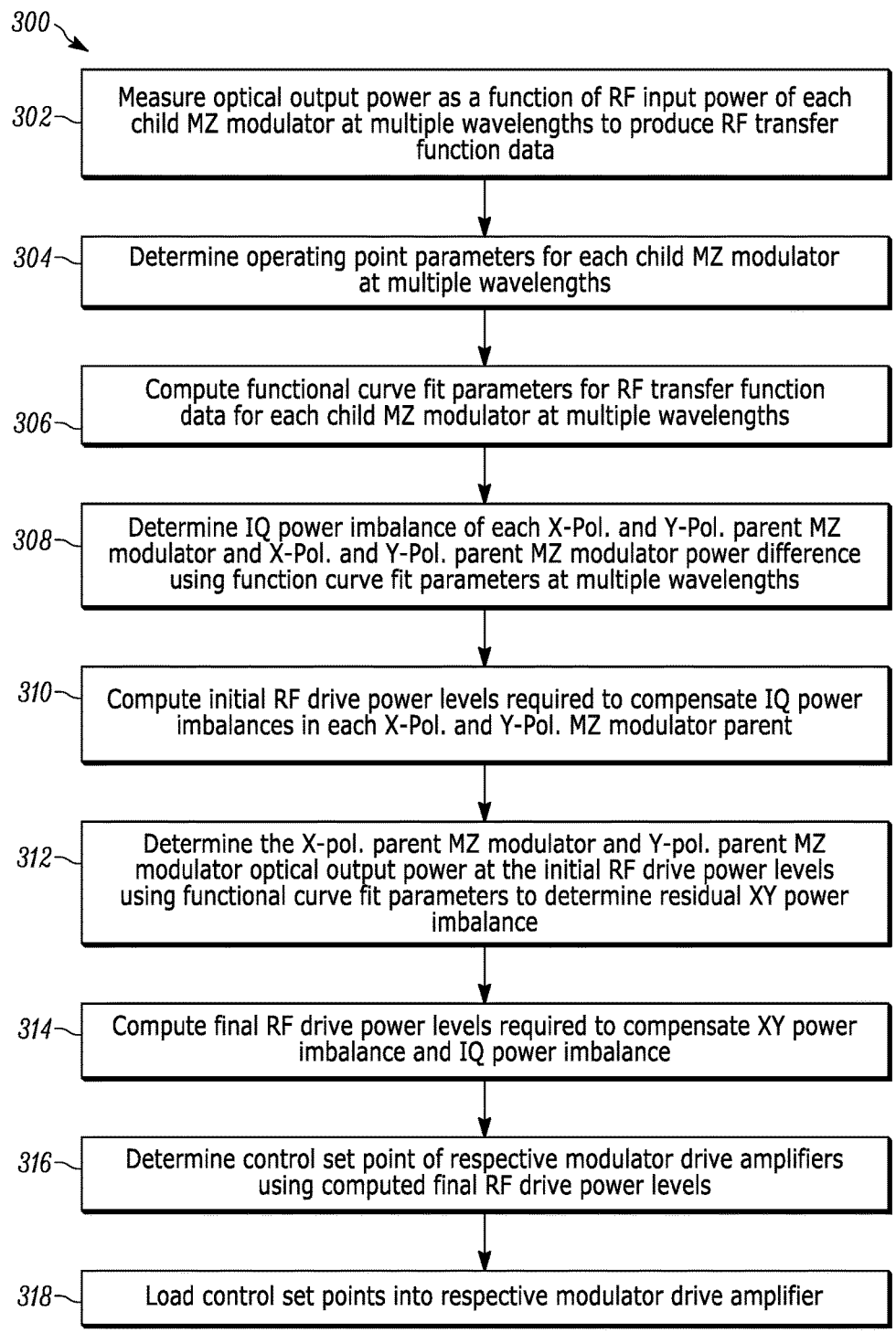
FIG. 3 illustrates a method for characterization and compensation of optical impairments in optical transmitters according to the present teaching.

FIG. 3 illustrates an embodiment of a method 300 for characterization and compensation of optical impairments in optical transmitters according to the present teaching. One skilled in the art will appreciate that not all steps in the method 300 are used in all embodiments of the present teaching. Also, some aspects of the method 300 are described in connection with an InP-based optical transmitter. However, it is understood that the method 300 can be used with numerous other types of optical transmitters. For example, in some embodiments, the method 300 characterizes and then compensates the wavelength dependence of IQ power imbalance and XY power imbalance of a dual-polarization in-phase and quadrature optical modulator based on InP technology. It is understood that the present teachings are not limited to such embodiments.

Referring to FIGS. 1, 2 and 3, in the first step 302 of the method 300, optical output power and RF input drive power of each child MZ modulator 104, 106, 108, and 110 is measured across a range of applied RF input power levels for all wavelengths across the optical C-band. The RF input drive power levels applied to the MZ modulators in the first step 302 are referred to as characterizing RF input drive power levels. The characterizing RF input drive power levels when applied as RF input drive power to various child MZ modulators allows an optical output power of the transmitter optical subassembly 102 to be measured as a function of the characterizing RF input drive power levels applied to each child MZ modulator. The first step 302 represents measuring wavelength dependent electro-optic RF transfer function of the each of the child MZ modulators 104, 106, 108, and 110 by measuring optical output power of each of child MZ modulator and the respective characterizing RF input drive power levels applied to the MZ modulator. The characterizing RF drive power levels applied to the MZ modulators are varied by varying the RF output power level of a 1 GHz RF signal from the signal generator 152.

To produce the modulator drive signals, the single-ended output of the RF sinusoidal signal source 152 is converted to a differential input by using a 180° RF hybrid 154, which may be a 3-GHz hybrid. The differential output of the 180° RF hybrid 154 is directed to the differential inputs of the RF modulator driver amplifiers 128, 130, 132, and 134 using a first and second 4-position RF switches 160, 170. The modulator drive amplifiers 128, 130, 132, and 134 produce a single-ended drive input to each child MZ modulator 104, 106, 108, and 110. In some embodiments, the RF input power provided by the modulator drive amplifier output 208 to the single-ended drive input to the MZ modulator is determined by reading out the DC voltage of a RF peak detector 210 in each of the particular driver amplifiers 128, 130, 132, and 134 in the transmitter optical subassembly 102.

In some embodiments, the varying RF input power sweeps the MZ modulator drive voltage from low voltage through the nominal $V_\pi$ of the MZ modulator. The RF-modulated optical power resulting from the swept RF input power is measured with the optical power meter 180. The MZ modulator drive voltage sweep is achieved by sweeping the power level of the signal generator 152 from low power to high power. The 180° RF hybrid 154 generates a differential output from the signal generator 152, and the RF switches 160, 170 are controlled to select which MZ modulator 104, 106, 108, and 110 is driven by the swept signal. In some embodiments, the RF input power to the MZ modulator is determined by reading the value of the RF peak detector voltage as a readout from the modulator driver amplifier 128, 130, 132, and 134.

In some embodiments, the entire optical transmitter modulator structure is biased to a minimum transmission state before the RF power is swept for each modulator sequentially by changing the switch state of the two 4-position RF switches 160, 170. Each MZ modulator is biased for near-zero optical output power at the output 120. In some embodiments, the output power of the optical modulator in the minimum transmission state is less than −45 dBm. The biasing at a minimum transmission state helps to ensure that there is no unmodulated optical power that would skew the measurement data. The measurement of the modulated (AC) optical power, that is at a frequency of 2 GHz in some embodiments, that is used to determine IQ imbalance and XY power imbalance cannot include the unmodulated CW optical power (DC) because it will skew the measurement data. Consequently, the modulators are biased at null transmission so that unmodulated CW optical power (DC) shall not leak through to the optical transmitter output 120. The electro-optic RF transfer functions of each of the four respective MZ modulator 104, 106, 108, and 110 are measured successively by applying a 1 GHz RF sinusoidal signal of varying RF input power levels to each of the four respective MZ modulator's RF input at a given time, while maintaining the DC bias of all MZ modulators biased at minimum transmission. In some embodiments, the sweeping of the RF input power to the MZ modulators comprises varying the RF output power of the 1 GHz sinusoidal signal source between −15 dBm and +6 dBm. The exact value of the swept RF output power of the 1 GHz sinusoidal signal source may also depend upon the child MZ modulator's input RF $V_\pi$ voltage. As will be clear to those skilled in the art, the MZ modulators may also be biased at other bias points while not departing from the apparatus and methods of characterization and calibration of the present teaching. For example, the initial bias condition for the child MZ modulators may be a quadrature operating point.

In some embodiments, the two 4-position RF switches 160, 170 are operated to sequentially drive each child MZ modulator. As such, the first RF switch 160 is configured to connect its input to output port 162 and the second RF switch 170 is configured to connect its input to output port 172. These output ports are connected to the positive and negative inputs of the modulator drive amplifier 128 connected to child MZ modulator MZM-XI 104. In many methods, the modulator drive amplifier 128 is only powered up during the measurement of the electro-optic RF transfer functions and then powered down. Then the two 4-position RF switches are reconfigured to connect their inputs to outputs 164, 174. The modulator drive amplifier 130 connected to MZM-XQ 106 is then powered up. Then the switch states are reconfigured to drive each of the other two modulator drive amplifiers 132, 134 connected to the remaining two child MZ modulators 108, 110 in the same manner. In various methods according to the present teaching, the order of the switching between various modulator drive amplifiers applied to various child MZ modulators may be any order.

The output of the first step 302 of the method of the present teaching is a set of measured electro-optics RF transfer functions, which is the RF-modulated optical output power as a function of the RF input power, for each child MZ modulator in the transmitter optical subassembly 102 at various optical wavelengths. In some embodiments, the wavelength dependence of the electro-optic RF transfer function curves are determined by tuning the laser source to various wavelengths across C-band, and then generating a transfer function curve for each wavelength. In some embodiments, the wavelengths represent each wavelength on the ITU grid across the full C-band wavelength range. For example, the wavelengths can represent 90-100 channels at 50 GHz spacing in an amplifier's C-band. In various embodiments, different wavelength ranges and/or particular wavelength values are measured.

The second step 304 of the method 300 is to compute wavelength dependent $V_\pi$ voltage for each MZ modulator using the electro-optic RF transfer function data generated in the first step 302. The P1-dB compression point is the input drive voltage to the modulator at which the optical output power of the modulator drops by 1 dB from a linear dependence on the MZ modulator drive voltage. The second step 304 of the method 300 determines the operating points by curve fitting. For example, the second step 304 includes computing at least one of a linear fit, a polynomial fit, or an inverse cosine functional fit to the RF transfer function data for each MZ modulator at a particular wavelength.

Figure 4:
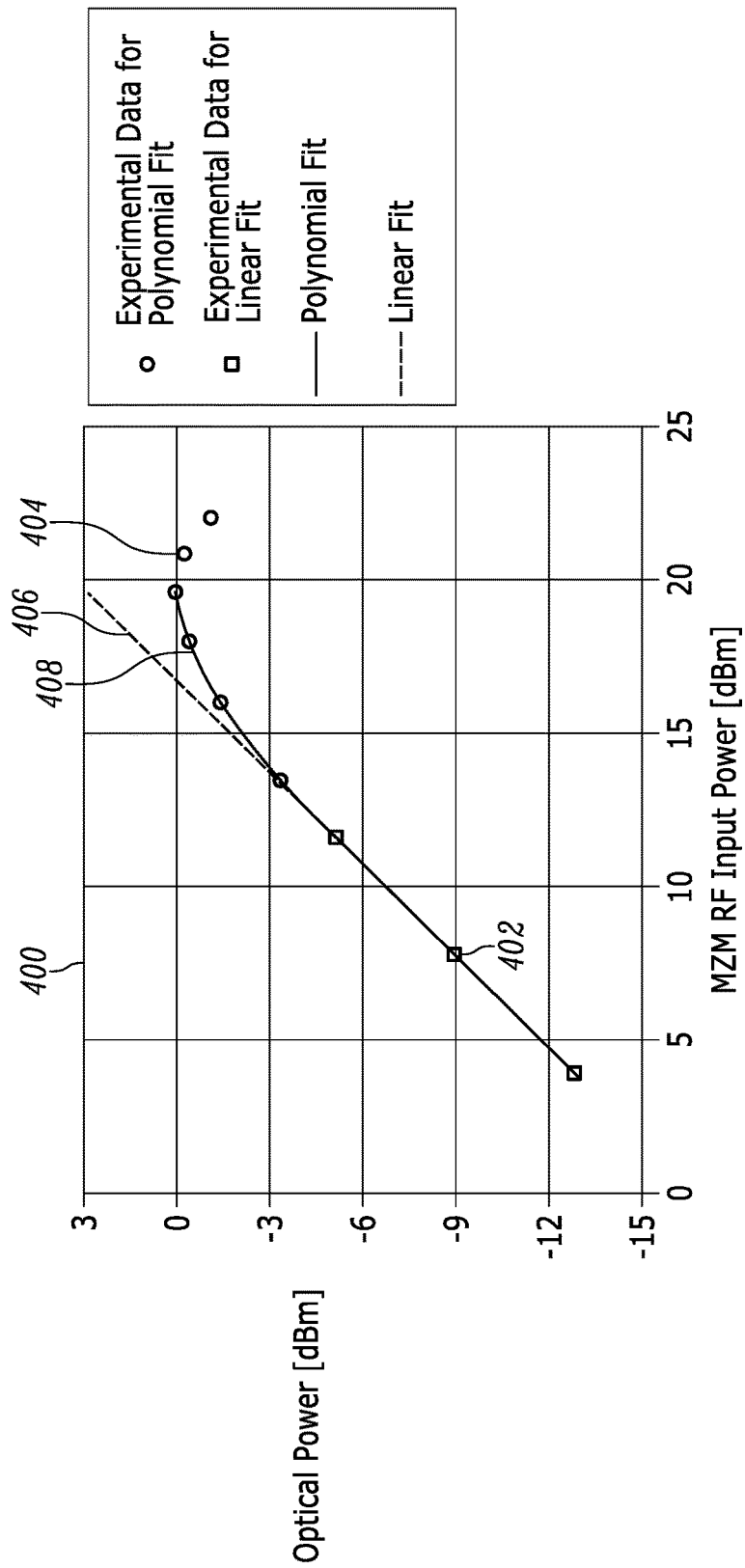
FIG. 4 illustrates a plot used to determine MZ modulator RF driving voltage parameters using the method of the present teaching.

FIG. 4 illustrates a plot 400 of the simulated P1-dB compression point determination used to compute $V_\pi$ voltage of a MZ modulator for one embodiment of the method 300 according to the present teaching. The squares 402 on the plot 400 represent experimental data used for a linear fit 406 of the RF transfer function. The circles 404 represent the experimental data used for a polynomial fit 408. Also plotted are the linear fit curve 406 and the polynomial fit curve 408. In some methods, the P1-dB compression point is the MZ modulator drive voltage point at which the polynomial curve 408 of optical power falls below the linear fit curve 406 of optical power by 1-dB. In some methods, the P1-dB compression point is the MZ modulator drive voltage point at which an inverse cosine functional fit curve of the optical power falls below the linear fit curve of optical power by 1-dB.

The wavelength dependent P1-dB compression point computed for each MZ modulator in the second step 304 can be converted to a wavelength dependent $V_\pi$ for each modulator. The $V_\pi$ voltage for each modulator 104, 106, 108, and 110 is a scaled version of P1-dB voltage. Equivalently, the P1-dB voltage is the peak-to-peak voltage at 1-dB compression point when the respective child MZ modulator is biased at the minimum transmission. This voltage is scaled by a scalar of value 1.3 to determine a $V_\pi$ for each child MZ modulator. Thus, the output of the second step 304 of the method 300 of the present teaching are wavelength dependent operating points of each MZ modulator in the optical transmitter modulator, and include 1-dB compression points and/or $V_\pi$ values.

In the third step 306 of the method 300, functional curve fit parameters are computed for the RF transfer function data of each MZ modulator at various wavelengths. The functional form of the curve fit may be a linear fit, a polynomial fit, an inverse cosine fit, or a curve fit following any of numerous other functional relationships. In the case of a linear fit, the functional parameters include the slope and the intercept of the linear fit. In this case, the third step 306 computes a linear curve fit to the measured wavelength dependent optical output power levels for each of the child MZ modulators versus MZ modulator RF drive power levels.

In the fourth step 308 of the method, the functional parameters computed in the third step 306 for respective child MZ modulators are used to evaluate the wavelength dependent IQ power imbalance in dB for X-Pol. and Y-Pol. IQ modulators as well as X-Pol. and Y-Pol. IQ modulators' output power difference as XY polarization power difference at a desired RF drive power level. The X-Pol. and Y-Pol. IQ modulators' output power difference as XY polarization power difference at a desired RF drive power level is also known as transmitter polarization dependent loss (PDL). In methods according to the present teaching using a linear functional fit, the fourth step 308 of the method 300 uses the slopes and intercepts computed in the third step 306 for respective child MZ modulators to evaluate the wavelength dependent IQ power imbalance in dB and XY polarization power difference at a desired RF drive power level, or particular MZ modulator operating point.

One feature of the present teaching is the ability to determine the impairment-induced power imbalances, and subsequent compensation set points which are described below, at select operating points of the MZ modulators in the optical modulator. By using a curve-fitting approach to determine functional parameters associated with each RF transfer curve for each child MZ modulator, the method of the present teaching can quickly calculate the power imbalances at any of a variety of modulator operating points. The use of the curve fitting method described herein advantageously reduces the computational time required to determine the optical power at a particular RF drive power as compared to known approaches that relies on look-up tables generated by the transfer curve measurement data. In various methods according to the present teaching, different modulator operating points are used, for example, when the transmitter operates with different modulation formats, such as either DP-QPSK or DP-16QAM modulation formats.

In some embodiments, the fourth step 308 determines wavelength dependent X-Polarization and Y-Polarization IQ-power imbalance for respective IQ MZ modulators per polarization and a XY-power imbalance in dual-polarization IQ MZ modulators at P1-dB compression point. In some embodiments, the power imbalances are determined at operating points comprising one or several RF input powers in a range of 10 dBm-13.5 dBm. Such a range is appropriate, for example, for a 16-QAM modulation scheme. In some methods according to the present teaching, the power imbalances are determined at operating points comprising one or several RF input powers that are in a range of 12 dBm-15 dBm, as appropriate for a QPSK modulation scheme.

Figure 5:
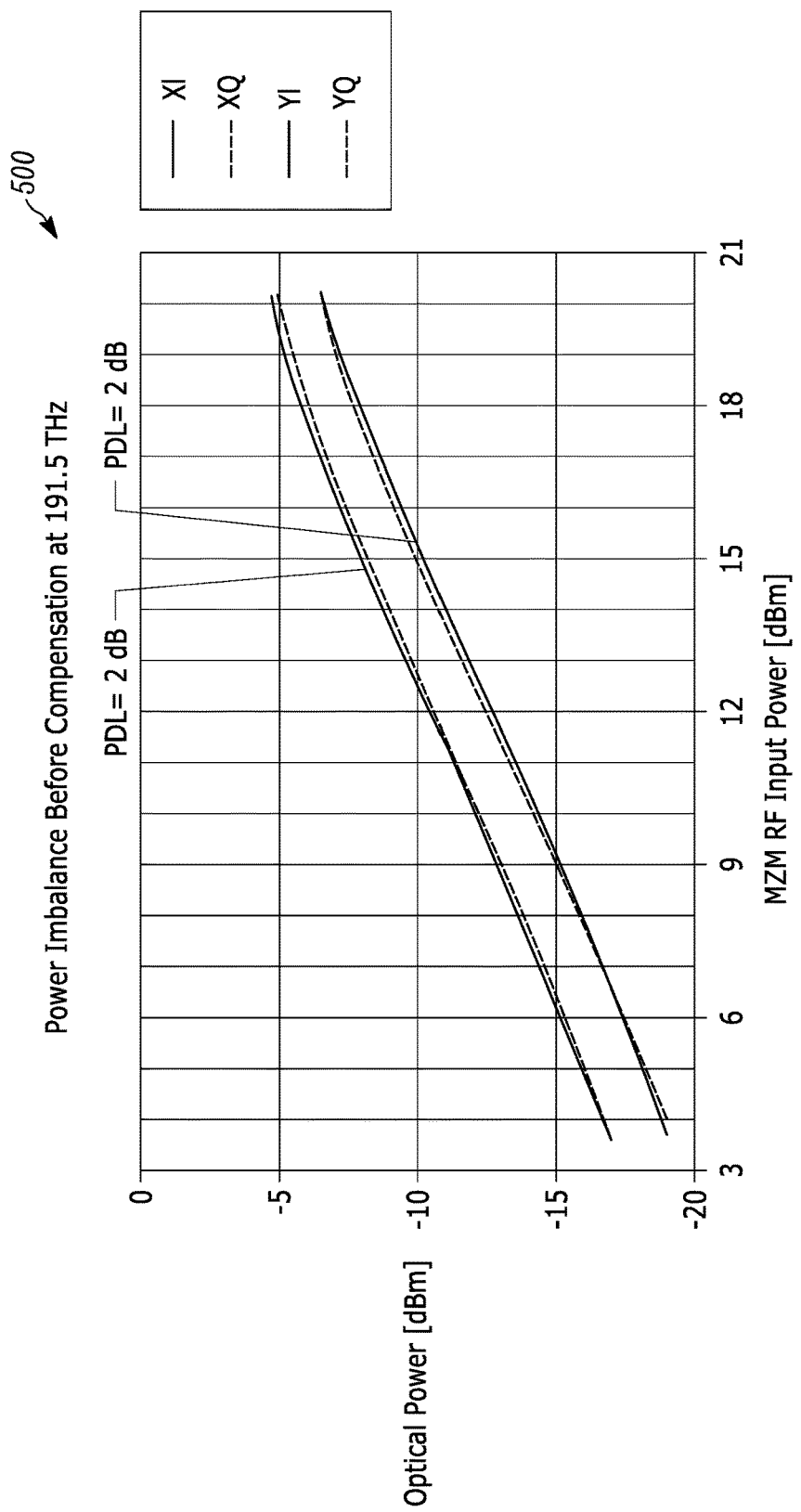
FIG. 5 illustrates a plot of the measured electro-optic RF transfer functions for four MZ modulators embedded into a wavelength tunable InP-based optical transmitter.

FIG. 5 illustrates a plot 500 of the measured RF transfer functions for four MZ modulators embedded into a wavelength tunable InP-based optical transmitter that modulates XI, XQ, YI, and YQ RF signals onto light emitted from a tunable laser source operated at a particular wavelength. The plot 500 shows measured P1-dB compression points at an RF input power of +15 dBm of four MZ modulators. The data are presented for a wavelength of 193.3 THz. The data show modulator response before compensation in RF domain and clearly shows the XY power imbalance, also known as transmitter polarization dependent loss (PDL), of ~2 dB.

In step five 310 of the method 300, the initial RF drive power levels required to compensate IQ imbalance is computed for each parent MZ modulator representing modulation of each polarization, X-Pol. and Y-Pol. In particular, for each of the two parent MZ modulators, the RF drive power level required to compensate ½ of the wavelength dependent IQ power imbalance by under driving the first child MZ modulator whose optical output power is higher compared to the second child MZ modulators' optical output power is determined. The RF drive power level required to compensate the remaining ½ of the wavelength dependent IQ power imbalance by over driving the second child MZ modulator in order to match their optical output power levels is also determined. The over drive and under drive are reversed in methods where first child MZ modulator has lower optical output power compared to the second child MZ modulators' optical output power in each polarization. The determined RF power levels are referred to as initial RF drive power levels, and represent the value of RF power applied to each of the four child MZ modulators that will reduce or compensate for IQ power imbalance in each parent X-Pol. and Y-Pol. IQ modulator.

In some methods according to the present teaching, the initial RF drive power levels required for compensation are determined directly using slopes and intercepts of the linear curve fits determined in step three 306. In other methods, the initial RF drive power levels are determined by comparing the parameters for fitted curves with other functional relationships, such as parabolic, inverse cosine, or other functional relationships of the RF transfer function data for the various MZ modulators. In these methods, the initial RF drive power levels are determined for various wavelengths based on the available data and curve fits for each child modulator.

In step six 312 of the method 300, the optical output powers of the two parent MZ modulator modulators is determined when driving at the respective initial RF drive power levels for each child MZ modulator. Thus, step six 310 computes X-Pol. and Y-Pol. IQ modulators' optical output powers at the initial RF drive power levels required to compensate respective wavelength dependent IQ power imbalances for each polarization IQ modulators that was determined in step five 310.

Step six 312 of the method 300 also computes the wavelength dependent XY power difference, which is the residual transmitter PDL that remained uncompensated after compensating the wavelength dependent IQ power imbalances of each of the IQ modulators in each polarization. Residual transmitter PDL also indirectly contributes to the overall XY power imbalance, or transmitter modulator PDL. The values of the optical output powers at the initial RF drive power levels are determined by using the functional curve fitted parameters for each child MZ modulator derived in step three 306 of method 300.

In step seven 314 of method 300, the operating RF drive power levels that are required to compensate for XY power imbalance and to compensate for IQ power imbalance of the optical output powers determined in step six 312 are determined. In some methods, step seven 314 computes the operating RF drive power levels required to compensate ½ of the wavelength dependent residual XY polarization power imbalance by under driving the pair of child MZ modulators embedded in first polarization IQ modulator whose optical output power level is higher compared to second polarization IQ modulators' optical output power. The remaining ½ of the XY power imbalance is compensated by over driving the pair of child MZ modulators embedded in the second polarization IQ modulator in order to match their optical output power levels. The over driving and under driving of respective pairs of child MZ modulators is reversed for the case where the first polarization IQ modulator has lower optical output power compared to second polarization IQ modulators' optical output power.

The operating RF drive power levels are then determined by using the functional curve fitting parameters for each MZ modulator at multiple wavelengths that were derived in step three 306 of method 300. In some methods using linear curve fitting, the operating RF drive power levels are determined using slopes and intercept of the linear curve fitting that were determined in step three 306. In other methods using inverse cosine curve fitting in step three 306, the peak-to-peak RF drive voltages of the respective child MZ modulators are computed so as to compensate for the IQ power imbalance and for the XY power imbalance by over and/or under driving the respective child MZ modulator whose output power is higher compared to its counterpart by using the inverse of the cosine function that models the modulator's optical modulation loss for a Vπ voltage that is computed from the P1-dB compression point or corresponding P1-dB voltage.

Step eight 316 of the method 300 determines the control set points for the modulator drive amplifiers for each child MZ modulator based on the operating RF drive power levels derived in step seven 314. In some methods, the control set points are RF automatic gain control set points in peak-to-peak voltage derived from the operating RF drive power levels. The control set points are determined on a per wavelength basis for each of the four child MZ modulators to compensate for the wavelength dependent IQ power imbalance in each polarization IQ modulator and to compensate for the XY power imbalance in the dual polarization IQ modulator.

In step nine 318 of the method 300, the control set points are loaded into the modulator drive amplifier controller. In some embodiments of the present teaching, the set points are provided to firmware that controls the modulator drive amplifier. The outputs of the linear RF modulator driver amplifiers are thus controlled in an automatic gain control mode of operation to unequally drive each child MZ modulator so that the InP-based optical transmitter generates a near-ideal DP-QPSK and DP-16QAM signal with less than ±0.1 dB of IQ-power imbalance per polarization and XY-power imbalance over the full C-band.

In some embodiments, the linear RF modulator driver amplifiers are operated in automatic gain control mode of operation to unequally drive the respective RF inputs of the child MZ modulators in order to compensate for the wavelength dependence of IQ power imbalance and for the wavelength dependence of XY power imbalance in an InP based optical transmitter. In some methods, a constant output voltage set point is used for each modulator drive amplifier. In these methods, the output drive levels are independent of the input levels within an input dynamic range of about 6 dB.

One feature of the methods and apparatus of the present teaching is that they have the ability to compensate for both optical polarization dependence and for IQ power imbalance in InP-based optical transmitters that provide tunable optical outputs in dual-polarization QPSK and QAM data formats at high data rates. In addition, these methods and apparatus are effective at ITU wavelengths across the entire C-band of commonly used optical amplifiers.

Figure 6A:
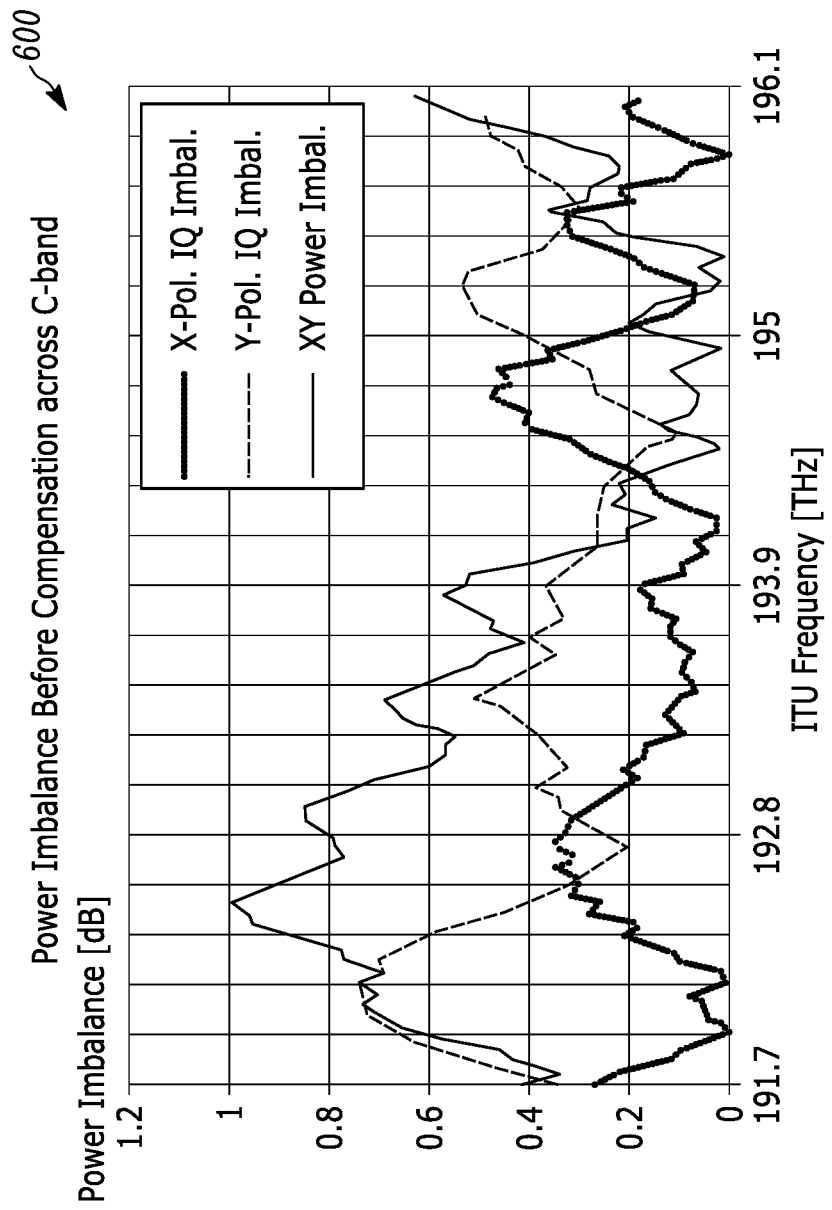
FIG. 6A illustrates the transmitter modulator power imbalances as a function of wavelength before compensation.

FIG. 6A illustrates the optical transmitter modulator power imbalances as a function of wavelength before compensation. Data are presented for ITU frequencies across the C-band. Power imbalances near 1 dB are evident, and in all cases, the power imbalances exceed 0.2 dB in several regions of the spectrum.

Figure 6B:
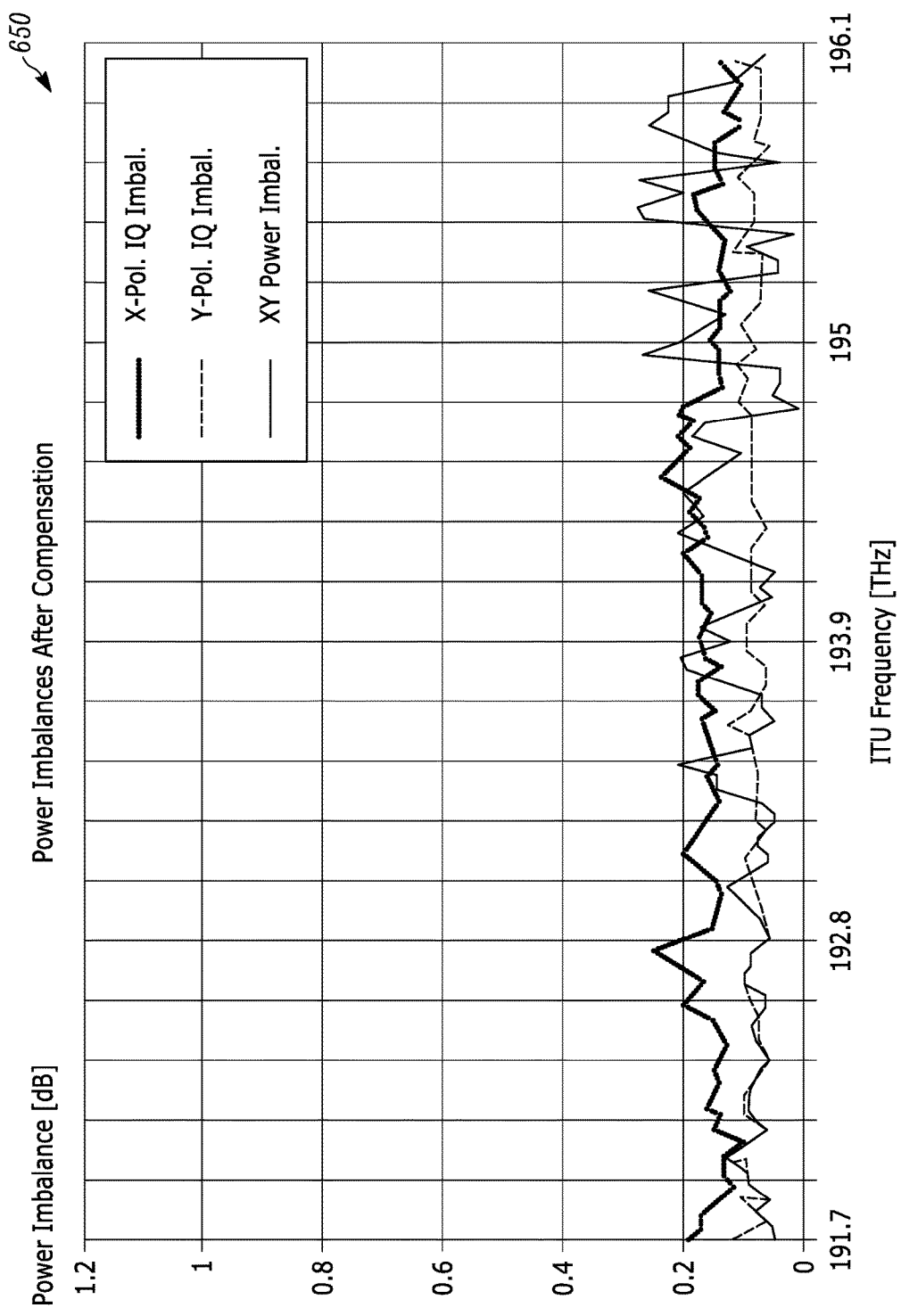
FIG. 6B illustrates the transmitter modulator power imbalances as a function of wavelength after compensation using the method of the present teaching.

FIG. 6B illustrates the transmitter modulator power imbalances as a function of wavelength after compensation using the method and apparatus of the present teaching. IQ power imbalances are near or below 0.2 dB across the entire spectrum, and XY power imbalance is near or below 0.2 dB across a majority of the spectral range. Comparing the data presented in FIG. 6A to the data presented in FIG. 6B, it should be clear to one skilled in the art that the compensation according to the present teaching substantially reduces the IQ imbalance in X-Pol. and Y-Pol. modulation, and also substantially reduces the XY imbalance of the transmitter modulator across the entire range of the C-band spectrum.

Figure 7A:
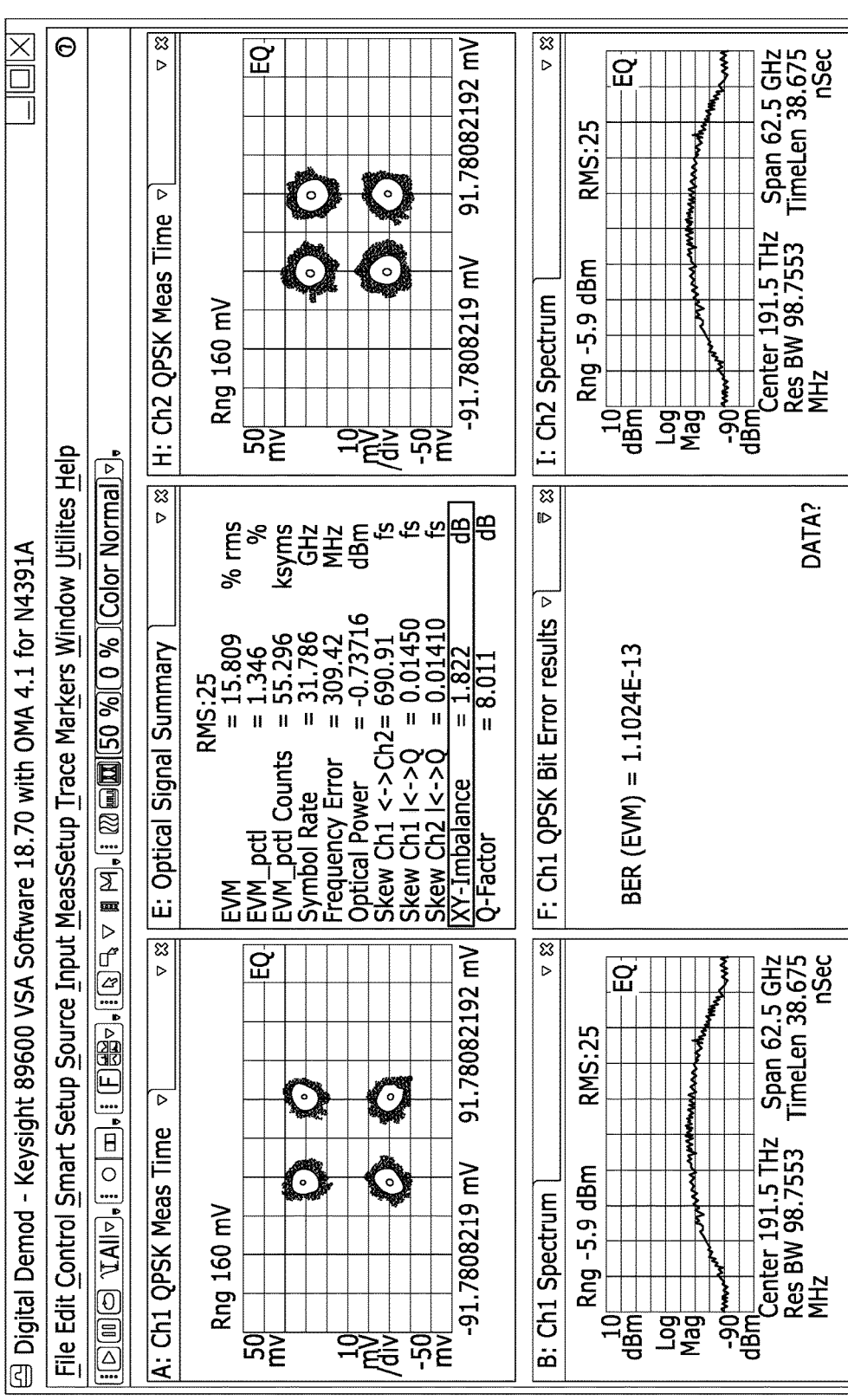
FIG. 7A illustrates measured performance data from a DP-QPSK transmitter without compensation.

FIGS. 7A and 7B illustrate measured data from a DP-QPSK transmitter without compensation. More specifically, the measured data shown in FIGS. 7A and 7B illustrates the measured constellation of a 31.785-Gb/s DP-QPSK signal with no RF compensation. The data from the optical modulation analyzer shows a XY power imbalance of 1.8 dB.

Figure 8A:
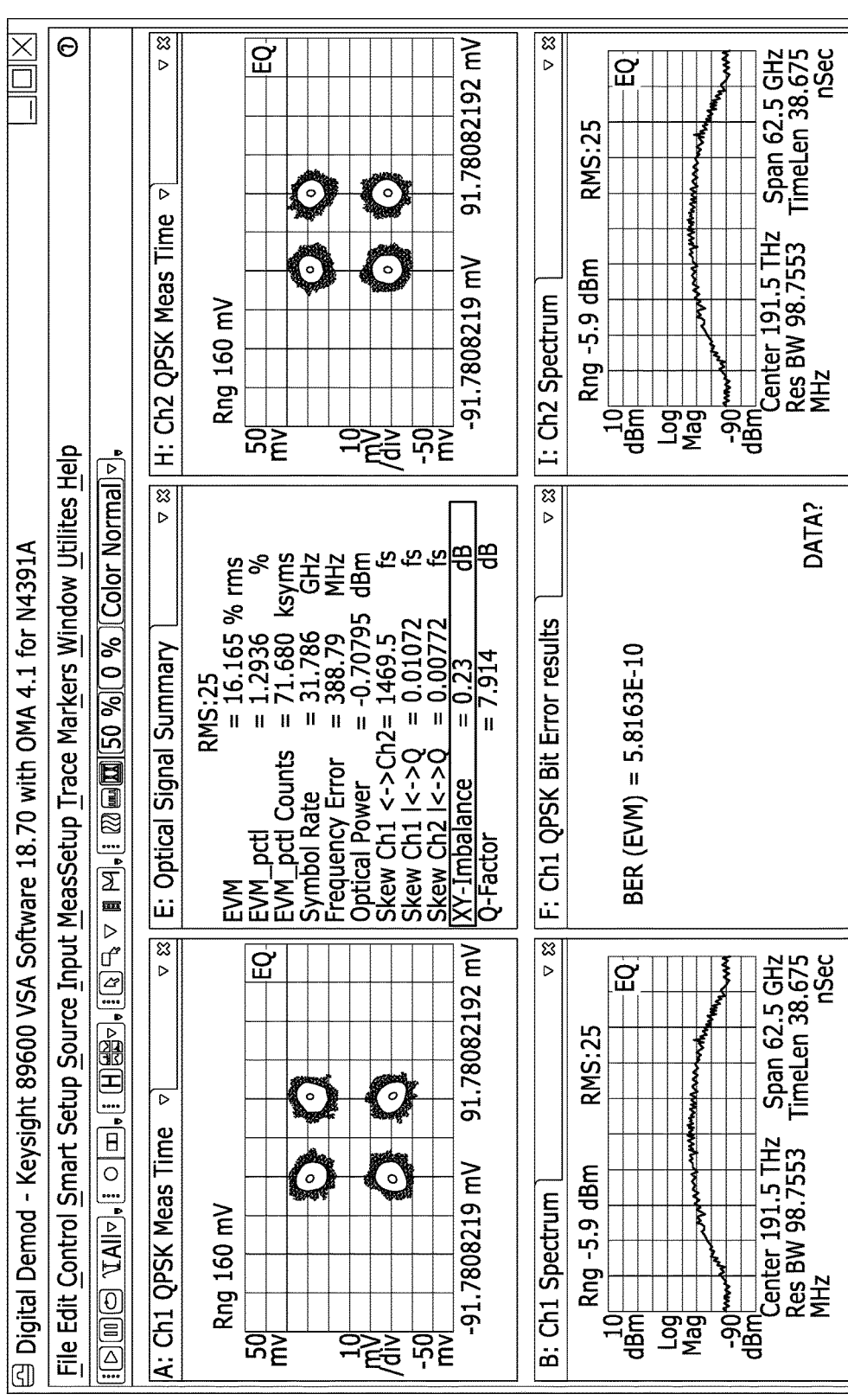
FIG. 8A illustrates measured performance data from a DP-QPSK transmitter using an embodiment of the compensation method of the present teaching.

FIGS. 8A and 8B illustrate measured data from a DP-QPSK transmitter using a compensation method according to the present teaching. More specifically, the data shown in FIGS. 8A and 8B illustrates the measured constellation of a 31.785-Gb/s DP-QPSK signal with RF compensation. The optical modulation analyzer data show a XY power imbalance of less than 0.2 dB and illustrates a known power transfer curve as a function of the ratio of load resistance to source resistance.

One feature of the method for characterizing and compensating for optical impairments in an optical transmitter of the present teaching is that it is possible to reduce the test and compensation time by using one of various interpolation techniques according to the present teaching. Some embodiments of methods according to the present teaching measure and compensate IQ power imbalance and XY power imbalance, or polarization dependent loss (PDL), per wavelength over the entire C-band of an erbium-doped fiber amplifier comprising 96 DWDM wavelength channels on a 50 GHz frequency grid. A per-wavelength-based calibration test takes almost 12 hours to complete in the factory in a production environment, which add significantly to the manufacturing costs and significantly decreases manufacturing capacity.

One aspect of the present teaching is the recognition that the pattern of the measured IQ power imbalance and/or XY power imbalance over C-band can be empirically determined in the laboratory and used for various interpolation methods to reduce the time required for calibration testing. The empirically determined patterns of the measured IQ power imbalance and/or XY power imbalance over C-band are used as a basis for a scheme in which IQ power imbalance and/or XY power imbalance is not measured on every wavelength, which can be a channel on an ITU grid. For example, in some embodiments, DWDM channels are measured to determine IQ power imbalance and/or XY power imbalance only after a predetermined number, such as every four, or every eight wavelengths. These measurements are then used to interpolate the RF AGC set points using a polynomial fit, such as a $5^{th}$ order polynomial fit, for the DWDM channels that were not measured. One skilled in the art will appreciate that numerous other interpolation methods known in the art can be used. This results in an accurate RF AGC set point for each channel in the DWDM channel spectrum, but with substantially reduced test and calibration time.

Another aspect of the present teaching is that the optical transmitters can generate optical signals with high spectral efficiency. In order to increase the spectral efficiency, state-of-the-art digital signal processors (DSP) designed for coherent optical communication that incorporate high-speed digital-to-analog converters within the DSP can be used.

Figure 9:
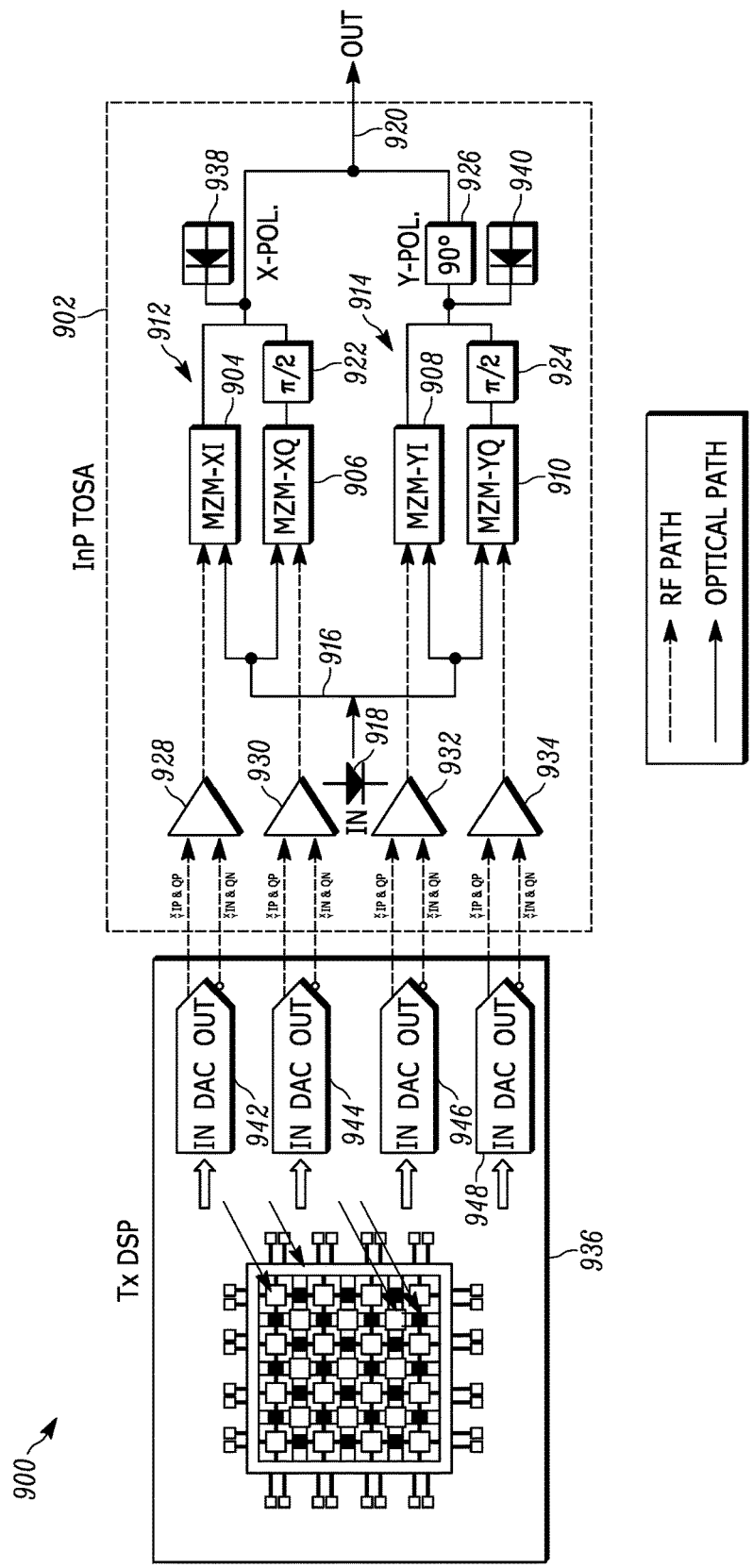
FIG. 9 illustrates a block diagram of an embodiment of an optical transmitter of the present teaching that includes a transmit DSP comprising high-speed digital-to-analog converters.

FIG. 9 illustrates a block diagram of an embodiment of an optical transmitter 900 of the present teaching that includes a transmit digital signal processor (DSP) module 936 comprising high-speed digital-to-analog converters. The transmitter optical sub-assembly (TOSA) 902 is similar to the TOSA 102 of FIG. 1. The TOSA 902 includes four child Mach-Zehnder modulators 904, 906, 908, 910 that form parent MZ modulators 912, 914. The first parent MZ modulator generates an X-polarized modulated optical beam, and the second parent MZ modulator generates an Y-polarized modulated optical beam. The first and second parent MZ modulators are configured to form a dual-polarization optical transmitter. In some embodiments, the transmitter generates a wavelength tunable modulated optical signal. The wavelength tunable signal can tune to various wavelength channels on the ITU grid. In some embodiments, there are more than two child MZ modulators in each parent MZ modulator.

The outputs of four modulator drive amplifiers 928, 930, 932, 934 provide an RF signal to the electrical input of respective child MZ modulators 904, 906, 908, 910. The differential inputs to the modulator drive amplifiers 928, 930, 932, 934 connect to the transmit DSP module 936.

The optical input 916 is optically coupled to a tunable laser 918. The optical output 920 combines the output of parent MZM 912 and parent MZM 914 after a polarization rotator 926. Parent MZM 912 includes a π/2 phase shifter 922, and parent MZM 914 includes a π/2 phase shifter 924. There are also internal monitor photodetectors 938, 940 that have inputs that are optically coupled to the output of respective parent MZs 912, 914, that monitor the output power and provide that information to the control system. Some embodiments include a third internal monitor photodetector (not shown) that monitors the output 920 and provides feedback information to the control system. The photodetectors are connected to the DSP module that includes control processors.

The transmit DSP module 936 includes high-speed digital-to-analog converters (DACs) 942, 944, 946, 948. These DACs 942, 944, 946, 948 each provide two complementary outputs, positive and negative, that are input to the complementary inputs, positive (XIP, XQP, YIP, YQP) and negative (XIN, XQN, YIN, YQN) of respective modulator drive amplifiers 928, 930, 932, 934. The child MZM 904 generates the x-polarized in-phase signal. The child MZM 906 generates the x-polarized quadrature signal. The child MZM 908 generates the y-polarized in-phase signal. The child MZM 910 generates the y-polarized quadrature signal.

The digital inputs for the DACs 942, 944, 946, 948 are generated by the DSP in response to the control system processor (not shown explicitly in FIG. 9) that is part of the DSP. For example, the DACs 942, 944, 946, 948 are capable of generating RF signals that, when used to drive the child MZMs 904, 906, 908, 910, generate specific desired pulse shapes including, for example, bandwidth-efficient pulse shapes with various desired Nyquist roll-off factors. In some embodiments, the TOSA 902 is an InP TOSA, and the MZ modulators are InP modulators. The modulator drive amplifiers 928, 930, 932, 934 are linear RF driver amplifiers and the child MZMs 904, 906, 908, 910 are InP optical modulators.

Thus, DSPs incorporating high-speed digital-to-analog converters are capable of performing digital signal processing operations, such as Nyquist pulse shaping to reduce the signal bandwidth on the transmit side. The pulse roll-off factor in Nyquist pulse shaping very effectively controls the signal bandwidth. However, Nyquist shaped signals have different peak-to-average power ratios for pulse roll-off factors ranging from 0.01 to 1. The Nyquist signals having high peak-to-average power ratios (PAPR) when amplified using RF driver amplifiers cause signal distortion in the RF driver due to clipping and overdrive of the optical Mach-Zehnder modulators. In some embodiments of the present teaching, the RF AGC set points are scaled during calibration to account for particular PAPR values for a particular Nyquist pulse roll-off setting. For example, root-raised cosine pulses with a pulse roll-off factor of 0.2 having PAPR of 7.55 dB are used for generating 16QAM modulation format at 32- or 40-GBaud.

Referring to FIG. 1 and FIG. 9, the DSP module 936 may also be configured to perform the function of the various RF components described in FIG. 1, thereby allowing the characterization and compensation method to be carried out in a small package. Specifically, the DSP module 936 will perform some or all of the functions of the processor 182, signal generator 152, hybrid 154, and RF switches 160, 170 that are described in connection with FIG. 1 so that they produce the described drive signals to the modulator drive amplifiers 928, 930, 932, 934 that provide the characterization and compensation functions. In some embodiments, internal photodetectors 938, 940 and/or an internal photodetector that monitors optical output power are used to provide the function provided by the optical power meter 180 described in connection with FIG. 1. These photodetectors are connected to the DSP, and the output of the photodetector is used to control the RF signals generated by the DACs 942, 944, 946, 948. In some embodiments, an external power meter is used to measure the optical power at output 920, and the output of the power meter is connected to the DSP to provide the signals that are used to control the DACs 942, 944, 946, 948.

In some embodiments, the DSP 936 is configured to generate an electro-optic RF transfer function for each of the child MZ modulators 904, 906, 908, 910, determine curve fitting parameters for each of the plurality of electro-optic RF transfer functions, determine operating points of each of the child MZ modulators 904, 906, 908, 910 using the curve fitting parameters, determine an IQ power imbalance at a particular operating point for each of the first and the second parent MZ modulators 912, 914 using the curve fitting parameters for each of the plurality of electro-optic RF transfer functions, determine initial RF input drive power levels applied to each of the child MZ modulators 904, 906, 908, 910 that compensate for the determined IQ power imbalance for each of the first and the second parent MZ modulators 912, 914, determine XY power imbalance of the optical transmitter at the determined initial RF input drive power levels using the curve fitting parameters, and determine operating RF input drive power levels that at least partially compensate for the first and second IQ power imbalances and for the XY power imbalance of the optical transmitter.

Figure 10A:
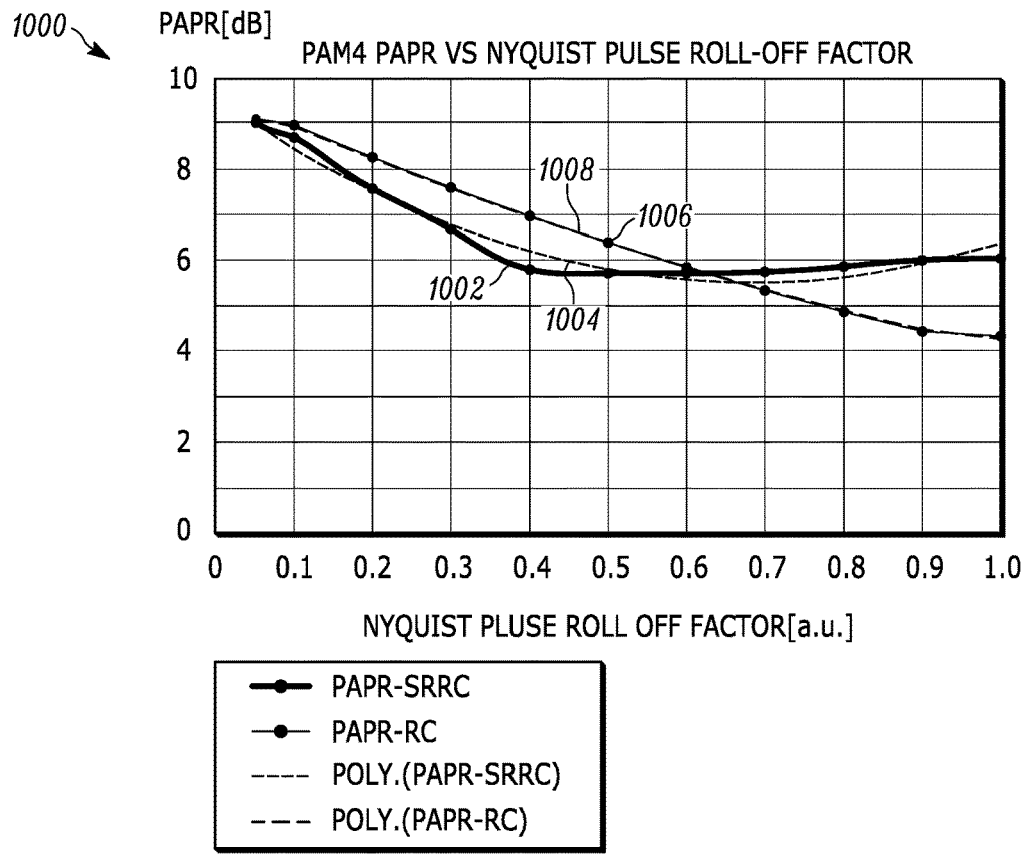
FIG. 10A illustrates a graph of the peak-to-average power ratio (PAPR) for pulse amplitude modulation with four levels (PAM4) as a function of the Nyquist pulse roll-off factor.
Figure 10B:
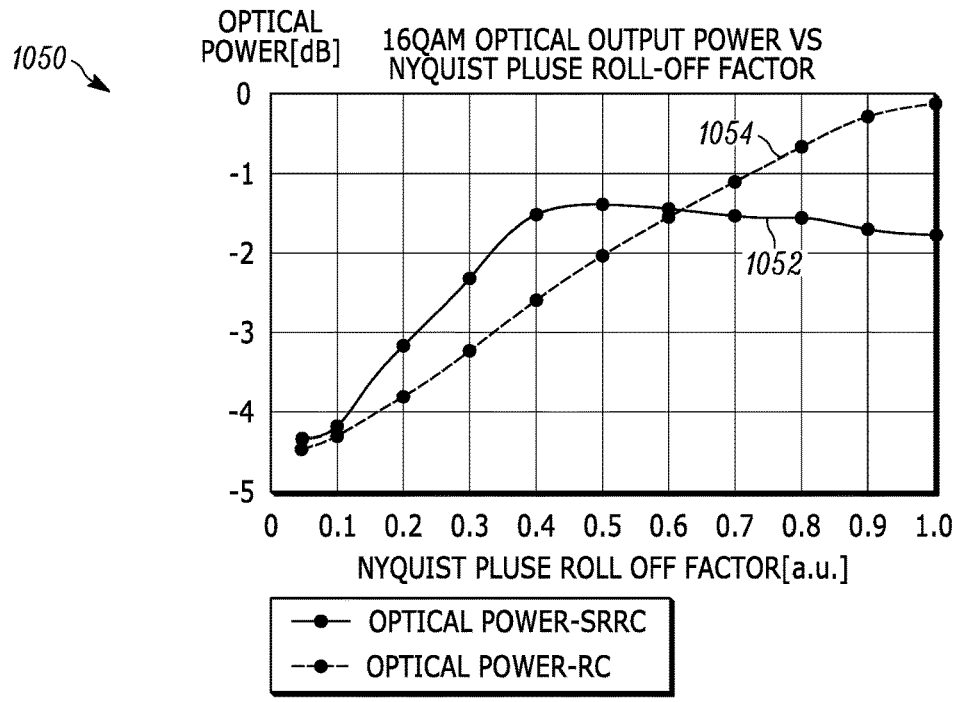
FIG. 10B illustrates a graph of the optical power for sixteen-level quadrature amplitude modulation (16QAM) as a function of the Nyquist pulse roll-off factor.

FIG. 10A illustrates a graph 1000 of the peak-to-average power ratio for pulse amplitude modulation with four levels (PAM4) as a function of the Nyquist pulse roll-off factor. The graph 1000 includes a plot 1002 showing empirical data for a square-root raised cosine signal and a plot 1004 of a polynomial fit to the empirical data. The graph 1000 also includes a plot 1006 showing empirical data for a raised cosine signal and a plot 1004 of a polynomial fit to the empirical data. FIG. 10B illustrates a graph 1050 of the optical power for sixteen-level quadrature amplitude modulation (16QAM) as a function of the Nyquist pulse roll-off factor. The graph shows a plot 1052 of data for a square-root raised cosine signal and a plot 1054 of data for a raised cosine signal.

Some embodiments of the methods of the present teaching use the assumption of a rectangular pulse shape and a mean RF AGC set point in determining the RF AGC set point. Rectangular pulse shapes have relatively low peak-to-average power ratios. In order to use Nyquist-pulse-shaped signals having different pulse roll-off factors, we compute the mean RF AGC set points lowered by considering the peak-to-average ratio due to nQAM signals and Nyquist pulse shaping. This will reduce signal distortion in the RF driver and optimally drive optical Mach-Zehnder modulators and consequently generate a near-ideal optical signal for transmission.

Figure 11A:
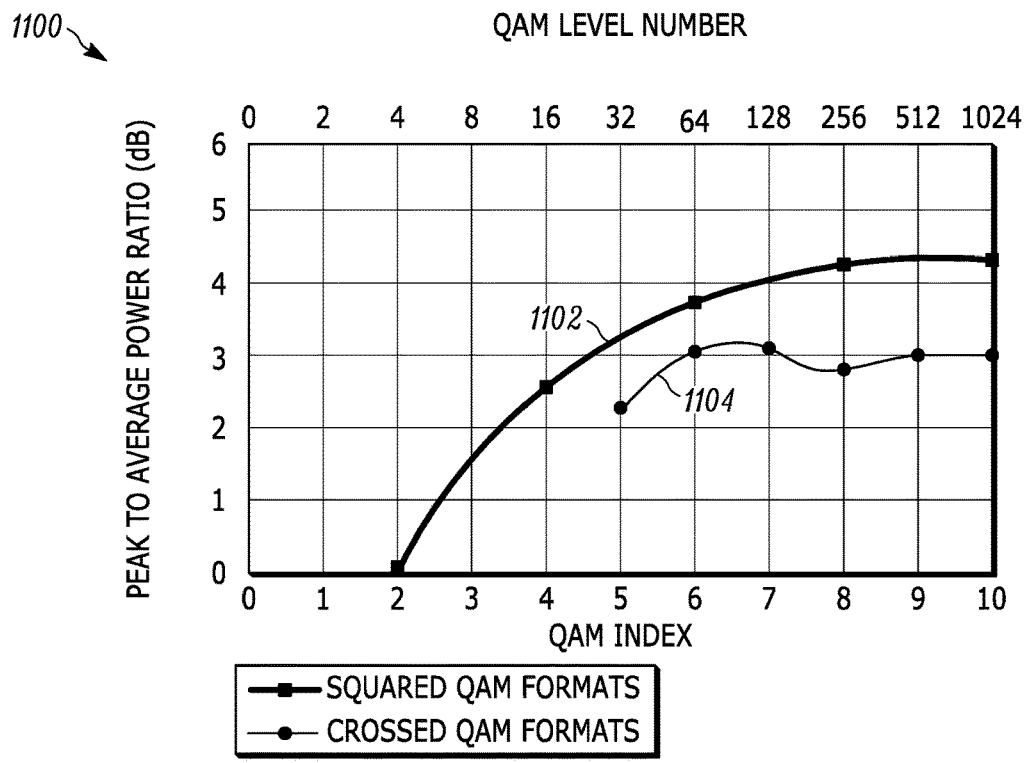
FIG. 11A illustrates a graph of the peak-to-average power ratios for nQAM signals generated by an embodiment of an optical transmitter of the present teaching.

FIG. 11A illustrates a graph 1100 of the peak-to-average power ratios for nQAM signals generated by an embodiment of an optical transmitter of the present teaching. The graph 1100 includes a plot 1102 of data for a square QAM format, showing the peak-to-average power ratio in dB as a function of QAM level number as well as QAM index. FIG. 11A also illustrates a plot 1104 of data for a cross QAM format.

Figure 11B:
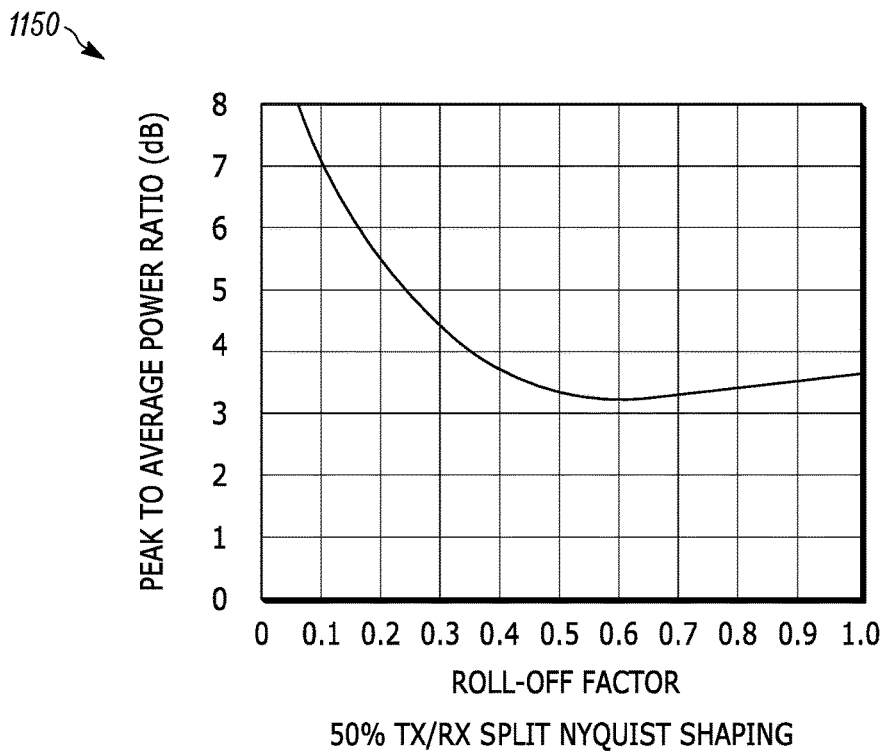
FIG. 11B illustrates a graph of the peak-to-average power ratio for different pulse roll-off factors for raised cosine filter transfer function with 50% Tx/Rx split Nyquist pulse shaping generated by an embodiment of an optical transmitter according to the present teaching.

FIG. 11B illustrates a graph 1150 of the peak-to-average power ratio for different pulse roll-off factors for raised cosine filter transfer function with 50% Tx/Rx split Nyquist pulse shaping generated by an embodiment of an optical transmitter according to the present teaching.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

What is claimed is:

1. A method for characterizing and compensating for optical impairments in an optical transmitter, the method comprising:
    a) operating an optical transmitter comprising a first parent Mach-Zehnder (MZ) modulator and a second parent MZ modulator, wherein each of the first and second parent MZ modulators comprises a plurality of child MZ modulators;
    b) biasing each of the plurality of child MZ modulators in the first and second parent MZ modulators at respective initial operating points;
    c) generating an electro-optic RF transfer function for each of the plurality of child MZ modulators by measuring a plurality of optical output powers of the optical transmitter while sweeping characterizing RF input drive power levels applied to each of the plurality of child MZ modulators;
    d) determining curve fitting parameters for each of the plurality of electro-optic RF transfer functions;
    e) determining operating points of each of the plurality of child MZ modulators using the curve fitting parameters;
    f) determining an IQ power imbalance at a particular operating point for each of the first and the second parent MZ modulators using the curve fitting parameters for each of the plurality of electro-optic RF transfer functions;
    g) determining initial RF input drive power levels applied to each of the plurality of child MZ modulators that compensate for the determined IQ power imbalance for each of the first and the second parent MZ modulators;
    h) determining XY power imbalance of the optical transmitter at the determined initial RF input drive power levels using the curve fitting parameters;
    i) determining operating RF input drive power levels that at least partially compensate for the first and second IQ power imbalances and for the XY power imbalance of the optical transmitter; and
    j) generating an optical signal comprising a Nyquist-pulse-shape at an output of the optical transmitter.

2. The method of characterizing and compensating of claim 1 wherein the plurality of child MZ modulators comprise InP MZ modulators.

3. The method of characterizing and compensating of claim 1 wherein the optical transmitter operates over a range of wavelengths.

4. The method of characterizing and compensating of claim 3 wherein the operating RF input drive power levels that at least partially compensate for the first and second IQ power imbalances and XY power imbalance of the optical transmitter are determined over the range of wavelengths.

5. The method of characterizing and compensating of claim 1 wherein the first parent MZ modulator generates a modulated optical beam having a first polarization and the second parent MZ modulator generates a modulated optical beam having a second polarization.

6. The method of characterizing and compensating of claim 1 wherein the biasing the plurality of child MZ modulators at the initial operating point comprises biasing the plurality of child MZ modulators at a minimum transmission level.

7. The method of characterizing and compensating of claim 1 wherein the biasing the plurality of child MZ modulators at the initial operating point comprises biasing the plurality of child MZ modulators at a bias that results in an optical output power that is less than −45 dBm.

8. The method of characterizing and compensating of claim 1 wherein the biasing the plurality of child MZ modulators at the initial operating point comprises biasing the plurality of child MZ modulators at a quadrature point.

9. The method of characterizing and compensating of claim 1 wherein the characterizing RF input drive power comprises characterizing RF input drive power over a particular RF frequency that is in a range of 500 MHz to 3 GHz.

10. The method of characterizing and compensating of claim 1 wherein the sweeping characterizing RF input drive power applied to of each of the plurality of child MZ modulators comprises sweeping the characterizing RF input drive power of each of the plurality of child MZ modulators sequentially.

11. The method of characterizing and compensating of claim 1 wherein the sweeping characterizing RF input drive power comprises sweeping characterizing RF input drive power of each of the plurality of child MZ modulators through a respective $V_\pi$ of the child MZ modulators.

12. The method of characterizing and compensating of claim 1 wherein the sweeping characterizing RF input drive power comprises varying an output power of an external RF signal generator coupled to an RF input of each of the plurality of child MZ modulators in a range of −15 dBm to +6 dBm.

13. The method of characterizing and compensating of claim 1 wherein the particular operating point used to determine the IQ power imbalance is $V\pi$.

14. The method of characterizing and compensating of claim 1 wherein the particular operating point used to determine the IQ power imbalance is between 10 dBm and 13.5 dBm.

15. The method of characterizing and compensating of claim 1 wherein the particular operating point used to determine the IQ power imbalance is between 12 dBm and 15 dBm.

16. The method of characterizing and compensating of claim 1 wherein the generating the electro-optic RF transfer function for each of the plurality of child MZ modulators by measuring the plurality of optical output powers of the optical transmitter while sweeping characterizing RF input drive power levels applied to each of the plurality of child MZ modulators comprises reading swept characterizing RF input drive power from an RF peak detector.

17. The method of characterizing and compensating of claim 16 wherein the RF peak detector is calibrated by measuring the response of the RF peak detector at three or more applied input voltages.

18. The method of characterizing and compensating of claim 1 wherein the determining curve fitting parameters for each of the plurality of electro-optic RF transfer functions comprises performing a linear curve fit.

19. The method of characterizing and compensating of claim 1 wherein the determining curve fitting parameters for each of the plurality of electro-optic RF transfer functions comprises performing a polynomial curve fit.

20. The method of characterizing and compensating of claim 1 wherein the determining curve fitting parameters for each of the plurality of electro-optic RF transfer functions comprises performing an inverse cosine curve fit.

21. The method of characterizing and compensating of claim 1 further comprising determining voltage set points of modulator drive amplifiers that drive the plurality of child MZ modulators using the operating RF drive powers.

22. The method of characterizing and compensating of claim 21 further comprising performing automatic gain control using the voltage set points of the modulator drive amplifiers to compensate power imbalances.

23. A method of characterizing and compensating for optical impairments in an InP-based optical transmitter, the method comprising:
   a) operating an optical transmitter comprising an X-Pol. IQ and a Y-Pol. IQ modulator, wherein each of the X-Pol. IQ and the Y-Pol. IQ modulators comprise a first and second child MZ modulator, over a range of wavelengths;
   b) biasing each of the first and second child MZ modulators in each of the X-Pol. IQ and the Y-Pol. IQ modulators at respective initial operating points;
   c) generating an electro-optic RF transfer function for each of the first and second child MZ modulators in each of the X-Pol. IQ and the Y-Pol. IQ modulators by measuring a plurality of optical output powers of the optical transmitter while sweeping a characterizing RF input drive power applied to each of the first and second child MZ modulators in each of the X-Pol. IQ and the Y-Pol. IQ modulators for at least some wavelengths in the range of wavelengths;
   d) determining curve fitting parameters for each of the electro-optic RF transfer functions;
   e) determining an IQ power imbalance for each of the X-Pol. IQ and the Y-Pol. IQ modulators using the curve fitting parameters;
   f) determining initial RF input drive powers that when applied to each of the first and second child MZ modulators in each of the X-Pol. IQ and the Y-Pol. IQ modulators compensate for each of the X-Pol. IQ and the Y-Pol. IQ modulator's determined IQ power imbalance;
   g) determining XY power imbalance of the optical transmitter at the determined initial RF input drive powers for each of the first and second child MZ modulators in each of the X-Pol. IQ and the Y-Pol. IQ modulators using the curve fitting parameters; and
   h) determining operating RF input drive powers for each of the first and second child MZ modulators in each of the X-Pol. IQ and the Y-Pol. IQ modulators that at least partially compensate for the first and second IQ power imbalances and for the XY power imbalance of the optical transmitter over the range of wavelengths.

24. The method of characterizing and compensating of claim 23 wherein the range of wavelengths comprises a range comprising ninety-six wavelengths on a 50-GHz frequency grid.

25. The method of characterizing and compensating of claim 23 wherein the range of wavelengths comprises a range that falls within a C-band of an erbium-doped fiber amplifier.

26. The method of characterizing and compensating of claim 23 wherein the generating the electro-optic RF transfer function for each of the first and second child MZ modulators in each of the X-Pol. IQ and the Y-Pol. IQ modulators comprises generating the electro-optic RF transfer function for each of the first and second child MZ modulators in each of the X-Pol. IQ and the Y-Pol. IQ modulators for only a predetermined number of wavelengths.

27. The method of characterizing and compensating of claim 26 wherein the predetermined number of wavelengths is either twelve or twenty-four.

28. The method of characterizing and compensating of claim 23 wherein the determining operating RF input drive powers for each of the first and second child MZ modulators in each of the X-Pol. IQ and the Y-Pol. IQ modulators that at least partially compensate for the IQ power imbalances and XY power imbalance of the optical transmitter are determined over the range of wavelengths comprises performing a polynomial fit for wavelengths that are not measured.

29. The method of characterizing and compensating of claim 28 wherein the polynomial fit comprises a fifth order polynomial fit.

30. The method of characterizing and compensating of claim 23 wherein the biasing the first and second child MZ modulators of the X-Pol. IQ and the Y-Pol. IQ modulators at the initial operating point comprises biasing the first and second child MZ modulators of the X-Pol. IQ and the Y-Pol. IQ modulators at a minimum transmission level.

31. The method of characterizing and compensating of claim 23 wherein the biasing the first and second child MZ modulators of the X-Pol. IQ and the Y-Pol. IQ modulators at the initial operating point comprises biasing the first and second child MZ modulators of the X-Pol. IQ and the Y-Pol. IQ modulators at bias points that results in an optical output power that is less than −45 dBm.

32. The method of characterizing and compensating of claim 23 wherein the biasing the first and second child MZ modulators of the X-Pol. IQ and the Y-Pol. IQ modulators at the initial operating point comprises biasing the first and second child MZ modulators of the X-Pol. IQ and the Y-Pol. IQ modulators at a quadrature point.

33. The method of characterizing and compensating of claim 23 wherein the sweeping the characterizing RF input drive power of each of the child MZ modulators comprises sweeping the power of each child MZ modulator sequentially.

34. The method of characterizing and compensating of claim 23 wherein the sweeping the characterizing RF input drive power comprises sweeping the characterizing RF input drive power of each child MZ modulator through their respective $V_\pi$.

35. The method of characterizing and compensating of claim 23 wherein the measuring the plurality of optical output powers of the optical transmitter as a function of the swept characterizing RF input drive power of each of the child MZ modulators comprises reading input drive power from an RF peak detector.

36. The method of characterizing and compensating of claim 35 wherein the RF peak detector is calibrated by measuring the response of the RF peak detector at three or more applied input voltages.

37. The method of characterizing and compensating of claim 23 wherein the determining curve fitting parameters for each of the electro-optic RF transfer function of the first and second child MZ modulators of the X-Pol. IQ and the Y-Pol. IQ modulators comprises performing a linear curve fit.

38. The method of characterizing and compensating of claim 23 wherein the determining curve fitting parameters for each of the electro-optic RF transfer function of the first and second child MZ modulators of the X-Pol. IQ and the Y-Pol. IQ modulators comprises performing a polynomial curve fit.

39. The method of characterizing and compensating of claim 23 wherein the determining curve fitting parameters for each of the electro-optic RF transfer function of the first and second child MZ modulators of the X-Pol. IQ and the Y-Pol. IQ modulators comprises performing an inverse cosine curve fit.

40. The method of characterizing and compensating of claim 23 further comprising determining voltage set points of modulator drive amplifiers that drive the first and second child MZ modulators of the X-Pol. IQ and the Y-Pol. IQ modulators using the operating RF input drive powers.

41. The method of characterizing and compensating of claim 40 further comprising performing automatic gain control using the voltage set points of the modulator drive amplifiers to compensate power imbalances.

42. An optical transmitter that characterizes and compensates for optical impairments, the optical transmitter comprising:
   a) a first parent Mach-Zehnder (MZ) modulator comprising a plurality of child MZ modulators, the first parent MZ modulator generating an X-polarized modulated optical beam;
   b) a second parent Mach-Zehnder (MZ) modulator comprising a plurality of child MZ modulators, the second parent MZ modulator generating an Y-polarized modulated optical beam, the first and second parent MZ modulator configured to form a dual-polarization optical transmitter that generates wavelength tunable modulated optical signals;
   c) a plurality of modulator drive amplifiers, each of the plurality of modulator drive amplifiers supplying modulation signals to respective child MZ modulators;
   d) a tunable laser source having an output that is optically coupled to an optical input of the dual-polarization optical transmitter;
   e) an optical photodetector having an input that is optically coupled to an output of the dual-polarization optical transmitter, the optical photodetector detecting RF modulation initiated by a signal generator and imposed by the child MZ modulators onto the wavelength tunable optical signals generated by the first and second parent MZ modulator configured to form the dual-polarization optical transmitter; and
   f) a digital signal processor comprising a plurality of digital-to-analog converters each having a plurality of RF outputs that are electrically connected to respective RF inputs of the plurality of modulator drive amplifiers that drive the child MZ modulators, the digital signal processor being configured to cycle RF modulation signals so that responses of each child MZ modulator to the RF modulation signals can be characterized, the digital signal processor having an input that is electrically connected to the optical photodetectors and configured to:
      i) generate an electro-optic RF transfer function for each of the plurality of child MZ modulators;
      ii) determine curve fitting parameters for each of the plurality of electro-optic RF transfer functions;
      iii) determine operating points of each of the plurality of child MZ modulators using the curve fitting parameters;
      iv) determine an IQ power imbalance at a particular operating point for each of the first and the second parent MZ modulators using the curve fitting parameters for each of the plurality of electro-optic RF transfer functions;
      v) determine initial RF input drive power levels applied to each of the plurality of child MZ modulators that compensate for the determined IQ power imbalance for each of the first and the second parent MZ modulators;
      vi) determine XY power imbalance of the optical transmitter at the determined initial RF input drive power levels using the curve fitting parameters; and
      vii) determine operating RF input drive power levels that at least partially compensate for the first and second IQ power imbalances and for the XY power imbalance of the optical transmitter.

43. The optical transmitter of claim 42 wherein the dual-polarization optical transmitter comprises a dual-polarization in-phase (I) and quadrature (Q) optical modulator and the tunable laser source comprises a full C-band-wavelength thermally-tunable laser source.

44. The optical transmitter of claim 42 wherein the plurality of modulator drive amplifiers comprise differential inputs.

45. The optical transmitter of claim 44 wherein the plurality of modulator drive amplifiers further comprises differential outputs.

46. The optical transmitter of claim 44 wherein the plurality of modulator drive amplifiers further comprises single-ended outputs.

47. The optical transmitter of claim 42 wherein the dual-polarization optical transmitter generates wavelength tunable modulated optical signals that comprise raised-cosine-shaped pulses with nQAM modulation.

48. The optical transmitter of claim 42 wherein the dual-polarization optical transmitter generates wavelength tunable modulated optical signals that comprise square-root-raised-cosine-shaped pulses with nQAM modulation.

* * * * *